(12) United States Patent
Zhang et al.

(10) Patent No.: US 12,255,709 B2
(45) Date of Patent: Mar. 18, 2025

(54) ANTENNA SYSTEM AND ACCESS NETWORK DEVICE

(71) Applicant: Huawei Technologies Co., Ltd., Shenzhen (CN)

(72) Inventors: Pengcheng Zhang, Xi'an (CN); Xiaojin Zheng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 341 days.

(21) Appl. No.: 17/896,909

(22) Filed: Aug. 26, 2022

(65) Prior Publication Data
US 2022/0407569 A1   Dec. 22, 2022

Related U.S. Application Data

(63) Continuation of application No. PCT/CN2021/078009, filed on Feb. 26, 2021.

(30) Foreign Application Priority Data

Feb. 27, 2020 (CN) .......................... 202010123881.1

(51) Int. Cl.
H04B 7/0456 (2017.01)
H01Q 1/52 (2006.01)
(Continued)

(52) U.S. Cl.
CPC ........... *H04B 7/0456* (2013.01); *H01Q 1/523* (2013.01); *H01Q 3/40* (2013.01); *H04B 1/583* (2013.01); *H04B 7/0413* (2013.01)

(58) Field of Classification Search
CPC .... H04B 7/0456; H04B 7/0617; H04B 7/086; H04B 7/0413; H04B 1/583; H01Q 1/523; H01Q 1/246; H01Q 3/40
See application file for complete search history.

(56) References Cited

U.S. PATENT DOCUMENTS 4,612,548 A   9/1986   Beltran
5,028,930 A   7/1991   Evans
(Continued)

FOREIGN PATENT DOCUMENTS

CN   1697529 A   11/2005
CN   1708150 A   12/2005
(Continued)

OTHER PUBLICATIONS

Islam, R. et al., "Compact Corporate Power Divider Using Metamaterial NRI-TL Coupled-Line Couplers," IEEE Microwave and Wireless Components Letter, vol. 18, No. 7, Jul. 2008, 3 pages.

*Primary Examiner* — Redentor Pasia
(74) *Attorney, Agent, or Firm* — SLATER MATSIL, LLP

(57) ABSTRACT

A bridge network and an antenna module are provided. The antenna module includes n antennas, the bridge network includes n bridge modules, a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules, and fourth ports of the n bridge modules are respectively connected to the n antennas, where i is an integer greater than or equal to 2 and less than or equal to n, and n is an integer greater than or equal to 2.

18 Claims, 10 Drawing Sheets

(51) Int. Cl.
*H01Q 3/40* (2006.01)
*H04B 1/58* (2006.01)
*H04B 7/0413* (2017.01)

(56) References Cited

U.S. PATENT DOCUMENTS

| | | | |
|---|---|---|---|
| 5,191,340 A | 3/1993 | Brandao et al. | |
| 8,786,493 B2* | 7/2014 | Pu | H01Q 21/0025 |
| | | | 455/562.1 |
| 10,009,051 B1* | 6/2018 | Yan | H04B 7/0413 |
| 10,432,272 B1 | 10/2019 | Black et al. | |
| 11,463,160 B2* | 10/2022 | Mendelsohn | H04B 7/18515 |
| 2004/0160361 A1* | 8/2004 | Izzat | H01Q 3/40 |
| | | | 342/360 |
| 2008/0191940 A1 | 8/2008 | Haskell | |
| 2013/0071112 A1* | 3/2013 | Melester | H04B 1/006 |
| | | | 455/67.14 |
| 2013/0293435 A1 | 11/2013 | White et al. | |
| 2016/0007102 A1* | 1/2016 | Raza | H04L 49/356 |
| | | | 398/45 |
| 2016/0226124 A1 | 8/2016 | Fasenfest | |
| 2017/0125873 A1 | 5/2017 | Kroening | |
| 2019/0027824 A1* | 1/2019 | Pajona | H01Q 7/00 |
| 2020/0028556 A1* | 1/2020 | Inoue | H04B 7/088 |
| 2020/0358473 A1* | 11/2020 | Chen | H04B 1/583 |
| 2021/0135721 A1* | 5/2021 | Lopez | H04B 5/45 |
| 2021/0296773 A1* | 9/2021 | Baniya | H05K 1/181 |

FOREIGN PATENT DOCUMENTS

| | | |
|---|---|---|
| CN | 102714805 A | 10/2012 |
| CN | 103414023 A | 11/2013 |
| CN | 208284635 U | 12/2018 |
| CN | 109644163 A | 4/2019 |
| CN | 110768698 A | 2/2020 |
| EP | 0325012 A1 | 7/1989 |

* cited by examiner

ANTENNA SYSTEM AND ACCESS NETWORK DEVICE

CROSS-REFERENCE TO RELATED APPLICATIONS

This application is a continuation of International Application No. PCT/CN2021/078009, filed on Feb. 26, 2021, which claims priority to Chinese Patent Application No. 202010123881.1, filed on Feb. 27, 2020. The disclosures of the aforementioned applications are hereby incorporated by reference in their entireties.

TECHNICAL FIELD

Embodiments of this application relate to the field of communications technologies, and in particular, to an antenna system and an access network device.

BACKGROUND

In mobile communications network engineering, a base station antenna is properly selected based on an actual condition such as a network coverage requirement, a traffic distribution, an anti-interference requirement, and network quality of service.

Currently, before the base station antenna transmits an analog signal, power aggregation is first performed on the analog signal by using a bridge network. The bridge network is mainly a network device including four intra-band combiners or 4M intra-band combiners, where M is a positive integer. Specifically, as shown in FIG. 1A, a first bridge sub-network includes two intra-band combiners. Because the intra-band combiner includes two inputs and two outputs, the two intra-band combiners in the first bridge sub-network each are connected to four or four groups of corresponding antennas. In this case, if four input analog signals are respectively inputted to four input terminals of two intra-band combiners in a second bridge sub-network, four output terminals corresponding to the two intra-band combiners in the first bridge sub-network may output four output analog signals corresponding to the four input analog signals, to implement a four-input four-output antenna transmission system. In a bridge network including 4M intra-band combiners, a 4M-input 4M-output antenna transmission system is implemented.

It can be learned from this that, in an architecture of the bridge network, only a four-input four-output solution, an eight-input eight-output solution, or the like can be supported, and a three-input three-output solution, a five-input five-output solution, or the like is not supported. However, in an actual application, most ranges covered by a base station each include three sectors. To implement power sharing between antenna signals of sector devices in the three sectors, a three-input three-output antenna transmission system is required. In the foregoing solution, a requirement of power sharing between the antenna signals of the sector devices cannot be met.

SUMMARY

Embodiments of this application provide an antenna system and an access network device, to meet an antenna signal transmission requirement such as a three-input three-output requirement, a four-input four-output requirement, or a five-input five-output requirement, thereby improving practicability of the antenna system in an actual application.

A first aspect of embodiments of this application provides an antenna system. The antenna system includes a bridge network and an antenna module, the antenna module includes n antennas, the bridge network includes n bridge modules, a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules, and fourth ports of the n bridge modules are respectively connected to the n antennas, where i is an integer greater than or equal to 2 and less than or equal to n, and n is an integer greater than or equal to 2; the $1^{st}$ bridge module in the n bridge modules performs first weighting processing on a first analog signal input at a first port of the $1^{st}$ bridge module and a second analog signal input at a second port of the $1^{st}$ bridge module, to obtain a first component and a second component, and the $1^{st}$ bridge module outputs the first component at a fourth port of the $1^{st}$ bridge module, and inputs, at the third port of the $1^{st}$ bridge module, the second component to the second port of the $n^{th}$ bridge module in the n bridge modules, to use the second component as a second analog signal of the second port of the $n^{th}$ bridge module; and a $k^{th}$ bridge module in the n bridge modules performs first weighting processing on a first analog signal input at a first port of the $k^{th}$ bridge module and a second analog signal input at a second port of the $k^{th}$ bridge module, to obtain a first component and a second component, and the $k^{th}$ bridge module outputs the first component at a fourth port of the $k^{th}$ bridge module, and inputs, at a third port of the $k^{th}$ bridge module, the second component to a second port of a $(k-1)^{th}$ bridge module in the n bridge modules, to use the second component as a second analog signal of the second port of the $(k-1)^{th}$ bridge module, where k is an integer greater than 1 and less than or equal to n.

In this embodiment, different bridge modules in the bridge network are connected in a ring connection manner, and a first analog signal input at a first port of each bridge module included in the bridge network has a corresponding output signal output at a fourth port of each bridge module, to meet an antenna signal transmission requirement such as a three-input three-output requirement, a four-input four-output requirement, or a five-input five-output requirement. For example, power sharing between antenna signals of three sectors included in a base station is implemented by using the antenna system in embodiments, and the antenna signals of the three sectors are respectively input to first ports of three bridge modules. Therefore, fourth ports of the three bridge modules respectively output output signals corresponding to the antenna signals of the three sectors, to implement three inputs and three outputs, thereby improving practicability of the antenna system in an actual application.

In a possible implementation, $$\begin{bmatrix} P_0 \\ P_1 \\ P_2 \\ P_3 \\ \cdots \\ \cdots \\ P_{n-1} \end{bmatrix} = Umatrix * \begin{bmatrix} p0 \\ p1 \\ p2 \\ p3 \\ \cdots \\ \cdots \\ p_{n-1} \end{bmatrix}, \begin{bmatrix} P_0 \\ P_1 \\ P_2 \\ P_3 \\ \cdots \\ \cdots \\ P_{n-1} \end{bmatrix}$$

is a matrix including a sum of output components of fourth ports of all of the n bridge modules, $$Umatrix = \frac{1}{\sqrt{2}}\left(S - \frac{D*S}{(\sqrt{2}*S - D*S)}\right), S = \begin{bmatrix} 0 & 1 & 0 & \dots \\ \dots & 0 & \dots & \dots \\ 0 & \dots & \dots & 1 \\ 1 & 0 & 0 & 0 \end{bmatrix},$$

S is an n*n matrix, $$D = \begin{bmatrix} e^{-i(2\pi\delta_0)} & 0 & \dots & 0 \\ 0 & e^{-i(2\pi\delta_1)} & \dots & \dots \\ \dots & \dots & \dots & 0 \\ 0 & 0 & \dots & e^{-i(2\pi\delta_{n-1})} \end{bmatrix},$$

D is an n*n matrix, $e^{-i(x)}$ is a complex exponential function whose base is a natural number e, $\delta_0$ is a wavelength trip corresponding to a line length of a connection line between the second port of the $1^{st}$ bridge module of the bridge network and a third port of a bridge module connected to the second port of the $1^{st}$ bridge module, $\delta_1$ is a wavelength trip corresponding to a line length of a connection line between a second port of a $2^{nd}$ bridge module of the bridge network and a third port of a bridge module connected to the second port of the $2^{nd}$ bridge module, $\delta_{n-1}$ is a wavelength trip corresponding to a line length of a connection line between the second port of the $n^{th}$ bridge module of the bridge network and a third port of a bridge module connected to the second port of the $n^{th}$ bridge module, and $$\begin{bmatrix} p0 \\ p1 \\ p2 \\ p3 \\ \dots \\ \dots \\ p_{n-1} \end{bmatrix}$$

is a matrix including a first analog signal of a first port of each of the n bridge modules.

In this possible implementation, a relationship between an input signal of a first port of a bridge module and an output signal of a fourth port of the bridge module is provided.

In another possible implementation, the antenna system further includes a control module, the control module is configured to set a line length of a connection line between the n bridge modules, and the line length of the connection line between the n bridge modules is used to control a proportion value of output signals of first ports of the n bridge modules.

In this possible implementation, a line length of a connection line between bridge modules is controlled by using the control module, to implement power allocation and sharing between antenna signals.

In another possible implementation, the antenna system further includes a digital signal processing module and a digital-to-analog conversion module, the digital signal processing module is connected to a first terminal of the digital-to-analog conversion module, and a second terminal of the digital-to-analog conversion module is connected to the bridge network; the digital signal processing module is configured to perform second weighting processing on a first multi-path digital signal received by the digital signal processing module, to obtain a second multi-path digital signal, where the second weighting processing is implemented by using a second weighting matrix, the second weighting matrix is an n*m matrix, n is a quantity of bridge modules included in the antenna system, m is a quantity of signals included in the first multi-path digital signal, and m is an integer greater than o and less than or equal to n; the second weighting matrix meets any one of the following conditions: column vectors of the second weighting matrix are orthogonal; each column vector of the second weighting matrix is orthogonal to one or more row vectors of a first weighting matrix; or the second weighting matrix is obtained by performing conjugate transposition on a first weighting matrix; and the digital-to-analog conversion module is configured to perform digital-to-analog conversion on the second multi-path digital signal, to obtain a first multi-path analog signal, where the first multi-path analog signal includes a first analog signal of a first port of m of the n bridge modules.

In this possible implementation, second weighting processing is performed on a digital domain signal by using the digital signal processing module, so that signal power sharing and allocation can be implemented in a digital domain.

In another possible implementation, the first multi-path digital signal includes m layers of MIMO transmit signals; signals sent by m users; signals sent by m cells; or signals sent in m beam directions.

In this possible implementation, a plurality of types of digital signals are provided, and power allocation and sharing between the plurality of types of digital signals are implemented.

In another possible implementation, each bridge module is an intra-band combiner.

A second aspect of embodiments of this application provides an antenna system. The antenna system includes a bridge network and an antenna module, the antenna module includes n antennas, the bridge network includes n bridge modules, a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in then bridge modules, and fourth ports of the n bridge modules are respectively connected to the n antennas, where i is an integer greater than or equal to 2 and less than or equal to n, and n is an integer greater than or equal to 2; the $n^{th}$ bridge module in the n bridge modules performs third weighting processing on a third analog signal input at a third port of the $n^{th}$ bridge module and a fourth analog signal input by an $n^{th}$ antenna in the n antennas to a fourth port of the $n^{th}$ bridge module, to obtain a third component and a fourth component, and the $n^{th}$ bridge module outputs the third component at a first port of the $n^{th}$ bridge module, and inputs, at the second port of the $n^{th}$ bridge module, the fourth component to a third port of the $1^{st}$ bridge module, to use the fourth component as a third analog signal of the third port of the $n^{th}$ bridge module; and a $j^{th}$ bridge module in the n bridge modules performs third weighting processing on a third analog signal input at a third port of the $j^{th}$ bridge module and a fourth analog signal input by a $j^{th}$ antenna to a fourth port of the $j^{th}$ bridge module, to obtain a third component and a fourth component, the $j^{th}$ bridge module outputs the third component at a first port of the $j^{th}$ bridge module, and inputs, at a second port of the $j^{th}$ bridge module, the fourth component to a third port of a $(j+1)^{th}$ bridge module, to use the fourth component as a third analog signal of the third port of the $(j+1)^{th}$ bridge module, where j is an integer greater than or equal to 1 and less than n.

In embodiments, different bridge modules in the bridge network are connected in a ring connection manner, a fourth analog signal received at a fourth port of each bridge module included in the bridge network has a corresponding output signal output at a first port of each bridge module, to implement power sharing and allocation between antenna signals, and improve practicability of the antenna system in an actual application.

In a possible implementation, $$\begin{bmatrix} x0 \\ x1 \\ x2 \\ x3 \\ \dots \\ \dots \\ x_{n-1} \end{bmatrix} = Umatrix^H * \begin{bmatrix} X_0 \\ X_1 \\ X_2 \\ X_3 \\ \dots \\ \dots \\ X_{n-1} \end{bmatrix}, \begin{bmatrix} x0 \\ x1 \\ x2 \\ x3 \\ \dots \\ \dots \\ x_{n-1} \end{bmatrix}$$

is a matrix including a sum of output components of first ports of all of the n bridge modules, $Umatrix^H$ is obtained by performing conjugate transposition on Umatrix, $$Umatrix = \frac{1}{\sqrt{2}}\left(S - \frac{D*S}{(\sqrt{2}*S - D*S)}\right), S = \begin{bmatrix} 0 & 1 & 0 & \dots \\ \dots & 0 & \dots & \dots \\ 0 & \dots & \dots & 1 \\ 1 & 0 & 0 & 0 \end{bmatrix},$$

S is an n*n matrix, $$D = \begin{bmatrix} e^{-i(2\pi\delta_0)} & 0 & \dots & 0 \\ 0 & e^{-i(2\pi\delta_1)} & \dots & \dots \\ \dots & \dots & \dots & 0 \\ 0 & 0 & \dots & e^{-i(2\pi\delta_{n-1})} \end{bmatrix},$$

D is an n*n matrix, $e^{-i(x)}$ is a complex exponential function whose base is a natural number e, $\delta_0$ is a wavelength trip corresponding to a line length of a connection line between a second port of the $1^{st}$ bridge module of the bridge network and a third port of a bridge module connected to the second port of the $1^{st}$ bridge module, $\delta_1$ is a wavelength trip corresponding to a line length of a connection line between a second port of a $2^{nd}$ bridge module of the bridge network and a third port of a bridge module connected to the second port of the $2^{nd}$ bridge module, $\delta_{n-1}$ is a wavelength trip corresponding to a line length of a connection line between the second port of the $n^{th}$ bridge module of the bridge network and a third port of a bridge module connected to the second port of the $n^{th}$ bridge module, and $$\begin{bmatrix} X_0 \\ X_1 \\ X_2 \\ X_3 \\ \dots \\ \dots \\ X_{n-1} \end{bmatrix}$$

is a matrix including a fourth analog signal of a fourth port of each of the n bridge modules.

In this possible implementation, a relationship between an analog signal received at a fourth port of a bridge module and an analog signal output at a first port of the bridge module is provided.

In another possible implementation, the antenna system further includes a control module, the control module is configured to set a line length of a connection line between the n bridge modules, and the line length of the connection line between the n bridge modules is used to control a proportion value of output signals of first ports of the n bridge modules.

In this possible implementation, a line length of a connection line between bridge modules is controlled by using the control module, to implement power allocation and sharing between antenna signals.

In another possible implementation, the antenna system further includes a digital signal processing module and a digital-to-analog conversion module, the digital signal processing module is connected to a first terminal of the digital-to-analog conversion module, and a second terminal of the digital-to-analog conversion module is connected to the bridge network; the digital-to-analog conversion module is configured to: receive a second multi-path analog signal sent by the bridge network, and perform digital-to-analog conversion on the second multi-path analog signal, to obtain a third multi-path digital signal; the digital signal processing module is configured to perform fourth weighting processing on the third multi-path digital signal, to obtain a fourth multi-path digital signal, where the fourth weighting processing is implemented by using a fourth weighting matrix, the fourth weighting matrix is an m*n matrix, m is a quantity of signals included in the third multi-path digital signal, and m is an integer greater than 0 and less than or equal to n; and the fourth weighting matrix meets any one of the following conditions: row vectors of the fourth weighting matrix are orthogonal; each row vector of the fourth weighting matrix is orthogonal to one or more column vectors of a third weighting matrix; or the fourth weighting matrix is obtained by performing conjugate transposition on the third weighting matrix.

In this possible implementation, fourth weighting processing is performed on a digital domain signal by using the digital signal processing module, so that signal power sharing and allocation can be implemented in a digital domain.

In another possible implementation, the third multi-path digital signal include m layers of MIMO receive signals; signals received by m users; signals received by m cells; or signals received in m beam directions.

In this possible implementation, a plurality of types of digital signals are provided, and power allocation and sharing between the plurality of types of digital signals are implemented.

In another possible implementation, each bridge module is an intra-band combiner.

A third aspect of embodiments of this application provides an access network device. The access network device includes the antenna system according to the first aspect and/or the antenna system according to the second aspect.

According to the foregoing technical solutions, it can be learned that embodiments of this application have the following advantages.

It can be learned from the foregoing technical solutions that different bridge modules in the bridge network in embodiments of this application are connected in a ring connection manner, and the first analog signal input at the first port of each bridge module included in the bridge network has a corresponding output signal output at the fourth port of each bridge module, to meet an antenna signal transmission requirement such as a three-input three-output requirement, a four-input four-output requirement, or a five-input five-output requirement by using the antenna system in embodiments of this application. For example, power sharing between antenna signals of the three sectors included in the base station is implemented by using the antenna system in embodiments of this application. The antenna signals of the three sectors are respectively input to the first ports of the three bridge modules. Therefore, the fourth ports of the three bridge modules respectively output output signals corresponding to the antenna signals of the three sectors, to implement three inputs and three outputs, thereby improving practicability of the solutions in an actual application.

DETAILED DESCRIPTION OF ILLUSTRATIVE EMBODIMENTS

The technical solutions of embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex ( ) system, an LTE time division duplex (TDD) system, a universal mobile telecommunications system (UMTS), a worldwide interoperability for microwave access (WiMAX) communications system, a future 5th generation (5G) system, or a new radio (NR) system.

Figure 1A:
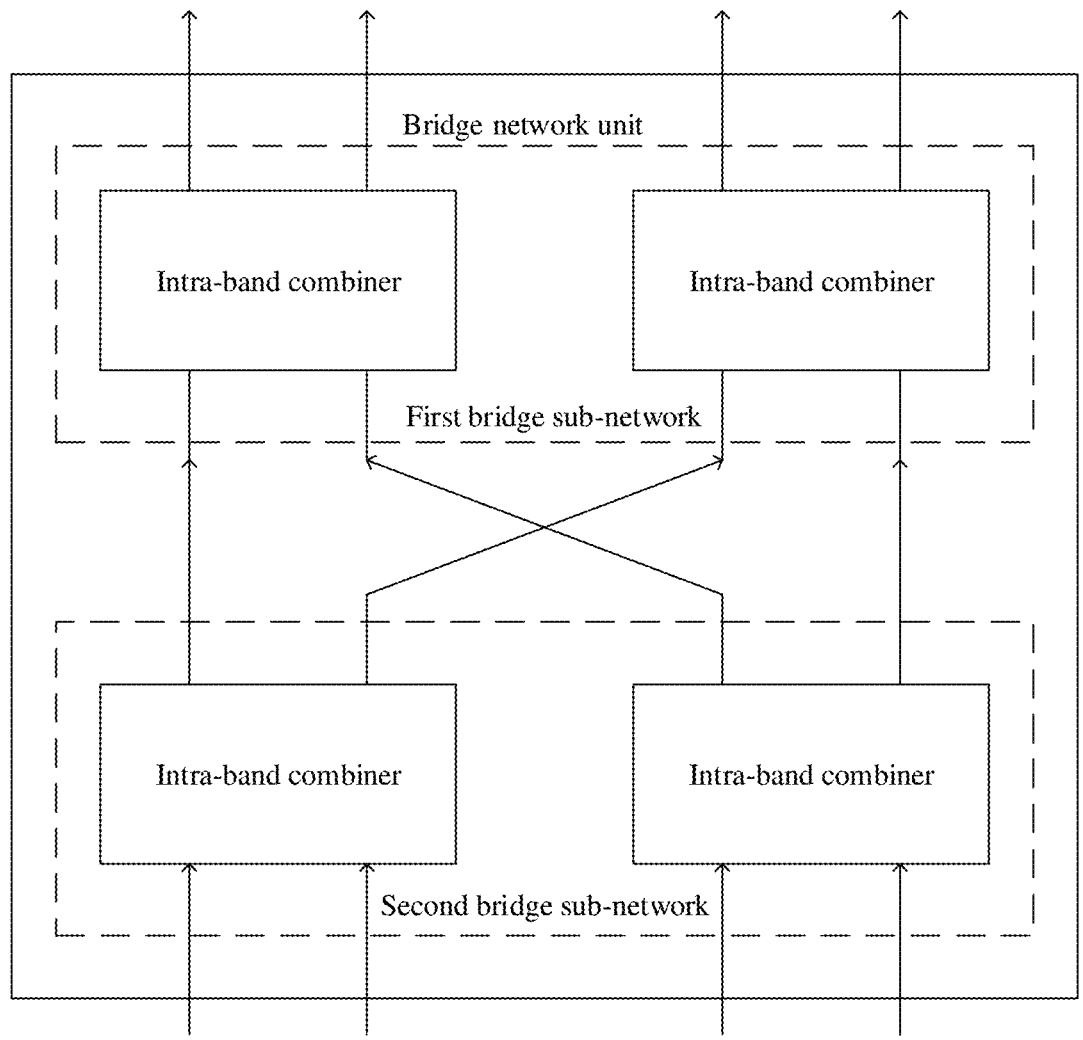
FIG. 1A is a schematic diagram of a structure of a bridge network in the conventional technology.
Figure 1B:
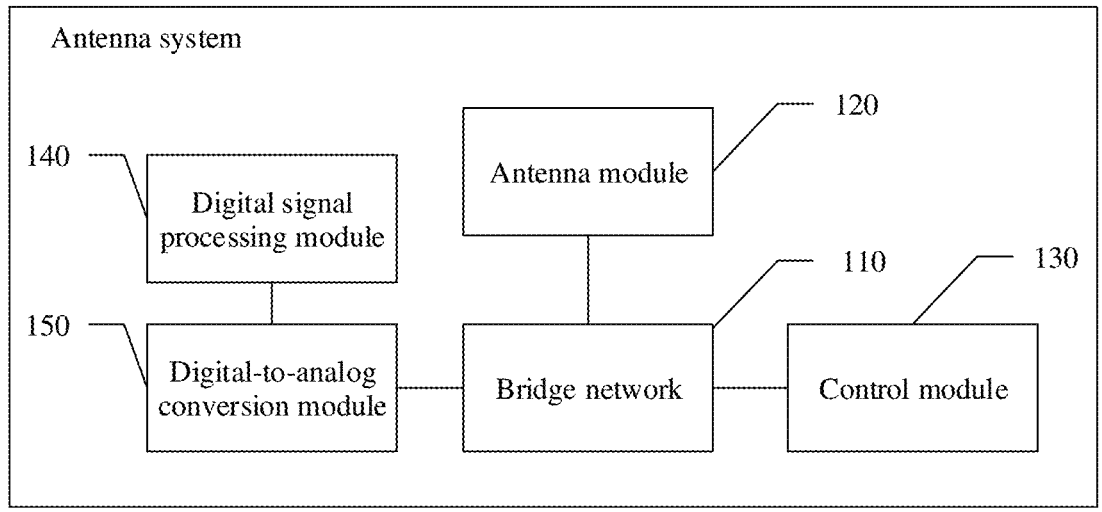
FIG. 1B is a schematic diagram of a structure of an antenna system according to an embodiment of this application.

FIG. 1B is a schematic diagram of a structure of an antenna system according to an embodiment of this application. The antenna system includes a bridge network 110 and an antenna module 120. Optionally, the antenna system includes a control module 130, a digital signal processing module 140, and a digital-to-analog conversion module 150.

The antenna module 120 is connected to a first terminal of the bridge network 110, a second terminal of the bridge network 110 is connected to the control module 130, and a third terminal of the bridge network 110 is connected to one terminal of the digital-to-analog conversion module 150.

The antenna module 120 is configured to receive and transmit an analog signal. The antenna module includes a plurality of antennas.

The bridge network 110 is configured to: receive an analog signal sent by the digital-to-analog conversion module 150, perform first weighting processing on the analog signal, and transmit the processed analog signal by using the antenna module 120; or is configured to: receive the analog signal sent by the antenna module 120, perform third weighting processing on the analog signal, and then output the processed analog signal. The bridge network 110 includes n bridge modules, where n is an integer greater than or equal to 2.

Figure 1C:
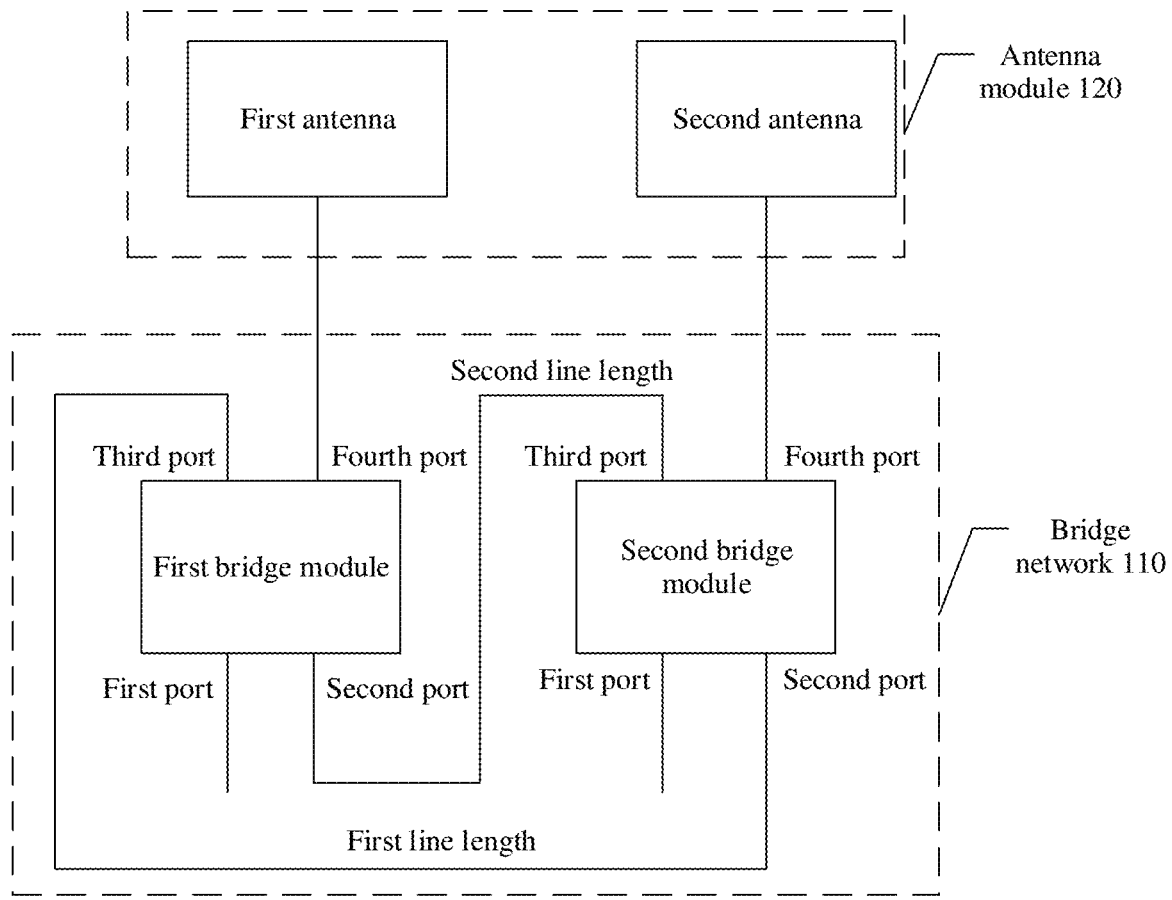
FIG. 1C is a schematic diagram of a structure of a bridge network and an antenna module according to an embodiment of this application.

The following describes the bridge network 110 by using an example in which the bridge network 110 includes a first bridge module and a second bridge module. FIG. 1C is a schematic diagram of a structure of a bridge network and an antenna module according to an embodiment of this application. The bridge network 110 includes the first bridge module and the second bridge module, the antenna module 120 includes a first antenna and a second antenna, a fourth port of the first bridge module is connected to the first antenna, and a fourth port of the second bridge module is connected to the second antenna. A third port of the first bridge module is connected to a second port of the second bridge module by using a first line length, and a third port of the second bridge module is connected to a second port of the first bridge module by using a second line length.

In this embodiment of this application, a port naming rule of the bridge module is as follows: A first port of the bridge module is configured to: receive the analog signal sent by the digital-to-analog conversion module 150, or send the analog signal sent by the digital-to-analog conversion module 150. A second port of the bridge module is configured to be connected to a third port of a bridge module connected to the second port of the bridge module. A third port of the bridge module is configured to be connected to a second port of a bridge module connected to the third port of the bridge module. A fourth port of the bridge module is configured to: receive an analog signal sent by an antenna connected to a fourth port of the bridge module, or send an analog signal to an antenna connected to a fourth port of the bridge module.

The control module 130 is configured to set a line length of a connection line between the n bridge modules included in the bridge network 110, to control a proportion value of output signals of first ports of the n bridge modules. For example, as shown in FIG. 1C, the control module 130 controls the first line length and the second line length, to control a proportion value of an output signal of the fourth port of the first bridge module to an output signal of the fourth port of the second bridge module.

The digital signal processing module 140 is configured to: receive a digital signal; perform second weighting processing on the digital signal, to obtain a processed digital signal; and convert the processed digital signal into an analog signal, and send the analog signal to the bridge network 110; or is configured to: receive the analog signal sent by the digital-to-analog conversion module 150, convert the analog signal into a digital signal, perform fourth weighting processing on the digital signal, and then output the processed digital signal.

Figure 1D:
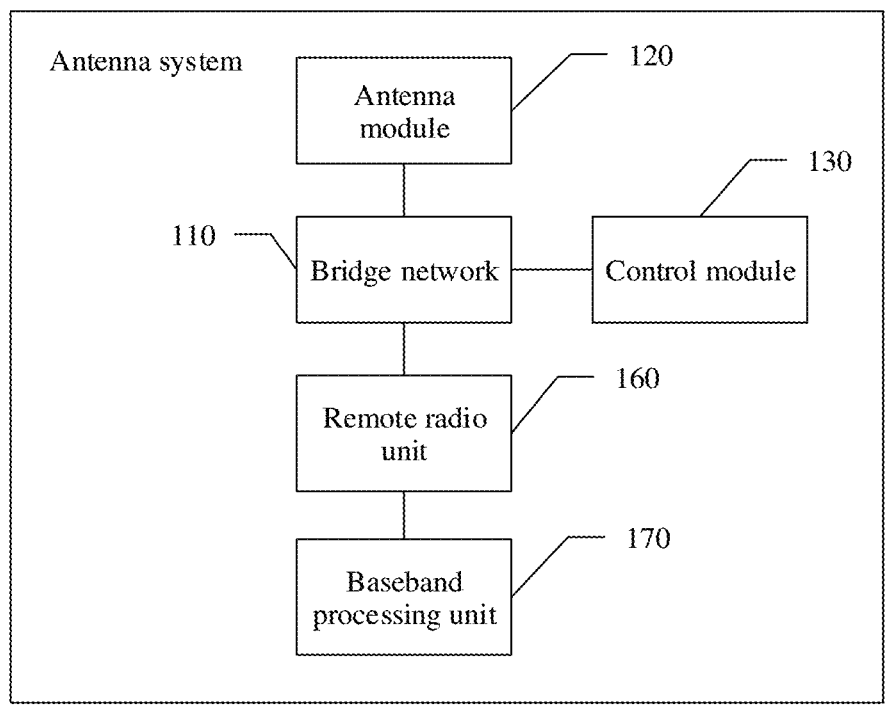
FIG. 1D is a schematic diagram of another structure of an antenna system according to an embodiment of this application.

With reference to FIG. 1D, the following describes a schematic diagram of a scenario in which the antenna system in this embodiment of this application is applied to an access network device. The access device may include an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), or an access point (AP), a wireless relay node, a wireless backhaul node, a transmission point ((TP) or transmission and reception point (TRP)), or the like in a Wi-Fi system, or may be a gNB or a transmission point (TRP or TP) in a 5G system, for example, an NR system, one or a group (including a plurality of antenna panels) of antenna panels of a base station in the 5G system, or may be a network node constituting a gNB or a transmission point, for example, a baseband unit (BBU), a distributed unit (DU), or the like.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, it may also be considered that higher layer signaling such as RRC layer signaling or PHCP layer signaling is sent by the DU, or sent by the DU+RU. It may be understood that the network device may be a CU node, a DU node, or a device including the CU node and the DU node. In addition, the CU may be classified as a network device in an access network RAN, or the CU may be classified as a network device in a core network CN. This is not limited herein. An access network device in a wired communications system may include a passive optical network (PON), a high-speed digital subscriber line (HDSL), an asymmetric digital subscriber line (ADSL), an integrated digital subscriber loop that has a $V_5$ interface, and the like.

FIG. 1D is a schematic diagram of another structure of an antenna system according to an embodiment of this application. The antenna system includes a bridge network 110, an antenna module 120, a control module 130, a remote radio unit 160, and a baseband processing unit 170. The digital signal processing module 140 shown in FIG. 1B is integrated into the baseband processing unit 170, and a digital-to-analog conversion function of the digital-to-analog conversion module 150 shown in FIG. 1B is provided by the remote radio unit 160.

A first terminal of the bridge network 110 is connected to the antenna module 120, a second terminal of the bridge network 110 is connected to the control module 130, a third terminal of the bridge network 110 is connected to a first terminal of the remote radio unit 160, and a first terminal of the baseband processing unit 170 is connected to a second terminal of the remote radio unit 160.

The antenna module 120 is configured to receive and transmit an analog signal. The antenna module includes a plurality of antennas.

The bridge network 110 is configured to: receive an analog signal sent by the remote radio unit 160, perform first weighting processing on the analog signal, and transmit the processed analog signal by using the antenna module 120; or is configured to: receive the analog signal sent by the antenna module 120, perform third weighting processing on the analog signal, and then output the processed analog signal to the remote radio unit 160.

The control module 130 is configured to set a line length of a connection line between n bridge modules included in the bridge network 110, to control a proportion value of output signals of first ports of the n bridge modules.

The remote radio unit 160 is configured to: receive a digital signal sent by the baseband processing unit 170, convert the digital signal into an analog signal, and send the analog signal to the bridge network 110.

The baseband processing unit 170 is configured to: receive a digital signal, perform second weighting processing on the digital signal, and send the processed digital signal to the remote radio unit 160; or receive a digital signal sent by the remote radio unit 160, and perform fourth weighting processing on the digital signal, to obtain a processed digital signal.

It should be noted that, when performing weighting processing on the digital signal, the baseband processing unit 170 may perform weighting processing before or after baseband processing. This is not specifically limited in this application.

Figure 1E:
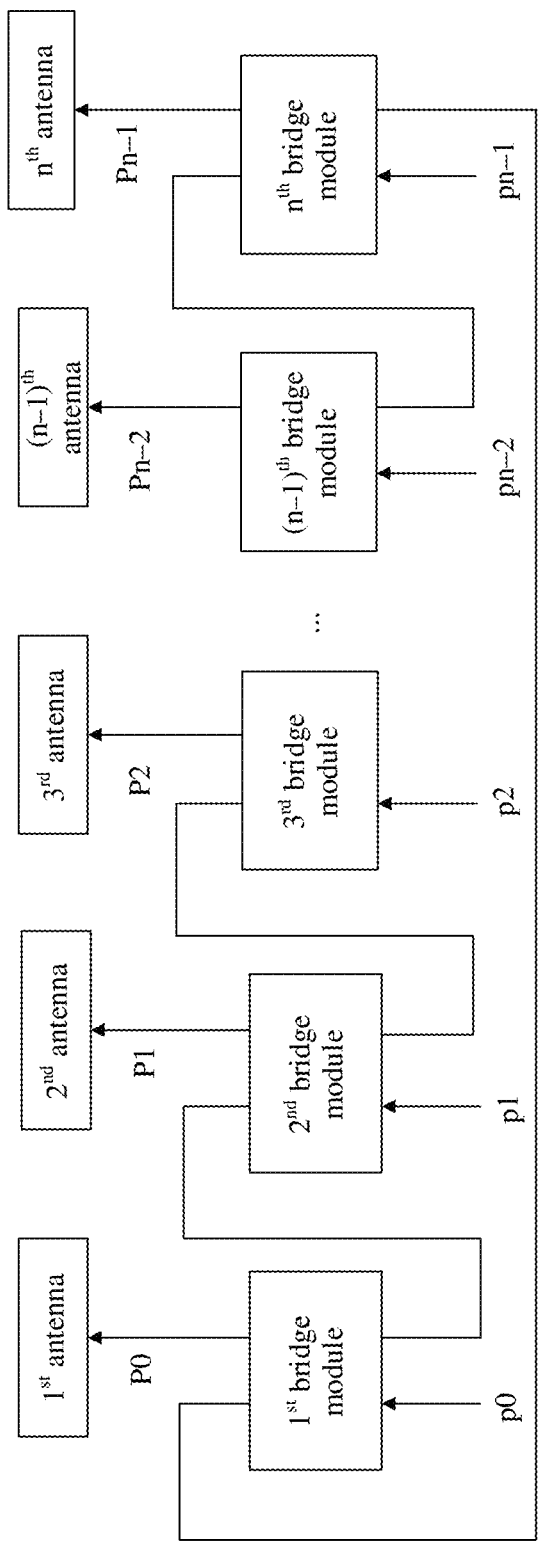
FIG. 1E is a schematic diagram of a scenario in which an antenna system transmits an analog signal according to an embodiment of this application.

Before the bridge network provided in this embodiment of this application is described, a sequence number of a bridge module in this embodiment of this application is first described. Referring to FIG. 1E, the bridge network includes n bridge modules. A $1^{st}$ bridge module is a $1^{st}$ bridge module in left-to-right bridge modules in the bridge network, a $2^{nd}$ bridge module is a $2^{nd}$ bridge module in the left-to-right bridge modules in the bridge network, and so on. In addition, the $1^{st}$ bridge module is connected to a $1^{st}$ antenna in n antennas, the $2^{nd}$ bridge module is connected to a $2^{nd}$ antenna in the n antennas, and by analogy, an $n^{th}$ bridge module is connected to an $n^{th}$ antenna in the n antennas.

FIG. 1E is a schematic diagram of a scenario in which an antenna system transmits an analog signal according to an embodiment of this application. In FIG. 1E, the bridge network 110 includes the n bridge modules, a third port of the $1^{st}$ bridge module in the n bridge modules is connected to a second port of the $n^{th}$ bridge module in the n bridge modules, a third port of an $i^{th}$ bridge module in the n bridge modules is connected to a second port of an $(i-1)^{th}$ bridge module in the n bridge modules, and fourth ports of the n bridge modules are respectively connected to the n antennas, where i is an integer greater than or equal to 2 and less than or equal to n, and n is an integer greater than or equal to 2.

The $1^{st}$ bridge module performs first weighting processing on a first analog signal input at a first port of the $1^{st}$ bridge module and a second analog signal input at a second port of the $1^{st}$ bridge module, to obtain a first component and a second component. The $1^{st}$ bridge module outputs the first component at a fourth port of the $1^{st}$ bridge module, and inputs, at the third port of the $1^{st}$ bridge module, the second component to the second port of the $n^{th}$ bridge module, to use the second component as a second analog signal of the second port of the $n^{th}$ bridge module.

A $k^{th}$ bridge module performs first weighting processing on a first analog signal input at a first port of the $k^{th}$ bridge module and a second analog signal input at a second port of the $k^{th}$ bridge module, to obtain a first component and a second component. The $k^{th}$ bridge module outputs the first component at a fourth port of the $k^{th}$ bridge module, and inputs, at a third port of the $k^{th}$ bridge module, the second component to a second port of a $(k-1)^{th}$ bridge module, to use the second component as a second analog signal of the second port of the $(k-1)^{th}$ bridge module, where k is an integer greater than 1 and less than or equal to n.

First analog signals input at first ports of the bridge modules included in the bridge network are represented as $$\begin{bmatrix} p_0 \\ p_1 \\ \ldots \\ p_{n-1} \end{bmatrix},$$

and analog signals output at the fourth ports of the bridge modules included in the bridge network are represented as $$\begin{bmatrix} P_0 \\ P_1 \\ \ldots \\ P_{n-1} \end{bmatrix}.$$

In this case, the analog signals output at the fourth ports of the bridge modules included in the bridge network are equal to values obtained by multiplexing the analog signals input at the first ports of the bridge modules included in the bridge network by a first weighting matrix Umatrix. In other words, $$\begin{bmatrix} P_0 \\ P_1 \\ \ldots \\ P_{n-1} \end{bmatrix} = Umatrix * \begin{bmatrix} p_0 \\ p_1 \\ \ldots \\ p_{n-1} \end{bmatrix}.$$

Herein, $$U_{matrix} = \frac{1}{\sqrt{2}}\left(S - \frac{D*S}{(\sqrt{2}*S - D*S)}\right), S = \begin{bmatrix} 0 & 1 & 0 & \ldots \\ \ldots & 0 & \ldots & \ldots \\ 0 & \ldots & \ldots & 1 \\ 1 & 0 & 0 & 0 \end{bmatrix},$$

S is an n*n matrix, n is a quantity of bridge modules included in the antenna system, $$D = \begin{bmatrix} e^{-i(2\pi\delta_0)} & 0 & \ldots & 0 \\ 0 & e^{-i(2\pi\delta_1)} & \ldots & \ldots \\ \ldots & \ldots & \ldots & 0 \\ 0 & 0 & \ldots & e^{-i(2\pi\delta_{n-1})} \end{bmatrix},$$

D is an n*n matrix, n is the quantity of bridge modules included in the antenna system, $e^{-i(x)}$ is a complex exponential function whose base is a natural number e, $\delta_0$ is a wavelength trip corresponding to a line length of a connection line between the second port of the $1^{st}$ bridge module and a third port of a bridge module connected to the second port of the $1^{st}$ bridge module, $\delta_1$ is a wavelength trip corresponding to a line length of a connection line between a second port of a $2^{nd}$ bridge module and a third port of a bridge module connected to the second port of the $2^{nd}$ bridge module, and $\delta_{n-1}$ is a wavelength trip corresponding to a line length of a connection line between the second port of the $n^{th}$ bridge module and a third port of a bridge module connected to the second port of the $n^{th}$ bridge module. Optionally, the connection line is a microstrip.

It should be noted that, in FIG. 1E, a second analog signal of a second port of each bridge module is initially a zero signal, and then after this cycle is performed, the second analog signal of the second port of the bridge module is a component input from a third port of a bridge module connected to the second port of the bridge module to the second port of the bridge module.

Different bridge modules in the bridge network in this embodiment of this application are connected in a ring connection manner, and a first analog signal input at a first port of each bridge module included in the bridge network has a corresponding output signal output at a fourth port of each bridge module, to meet an antenna signal transmission requirement such as a three-input three-output requirement, a four-input four-output requirement, or a five-input five-output requirement by using the antenna system in embodiments of this application. For example, power sharing between antenna signals of three sectors included in a base station is implemented by using the antenna system in this embodiment of this application. The antenna signals of the three sectors are respectively input to first ports of three bridge modules. Therefore, fourth ports of the three bridge modules respectively output output signals corresponding to the antenna signals of the three sectors, to implement three inputs and three outputs, thereby improving practicability of the antenna system in an actual application.

Figure 1F:
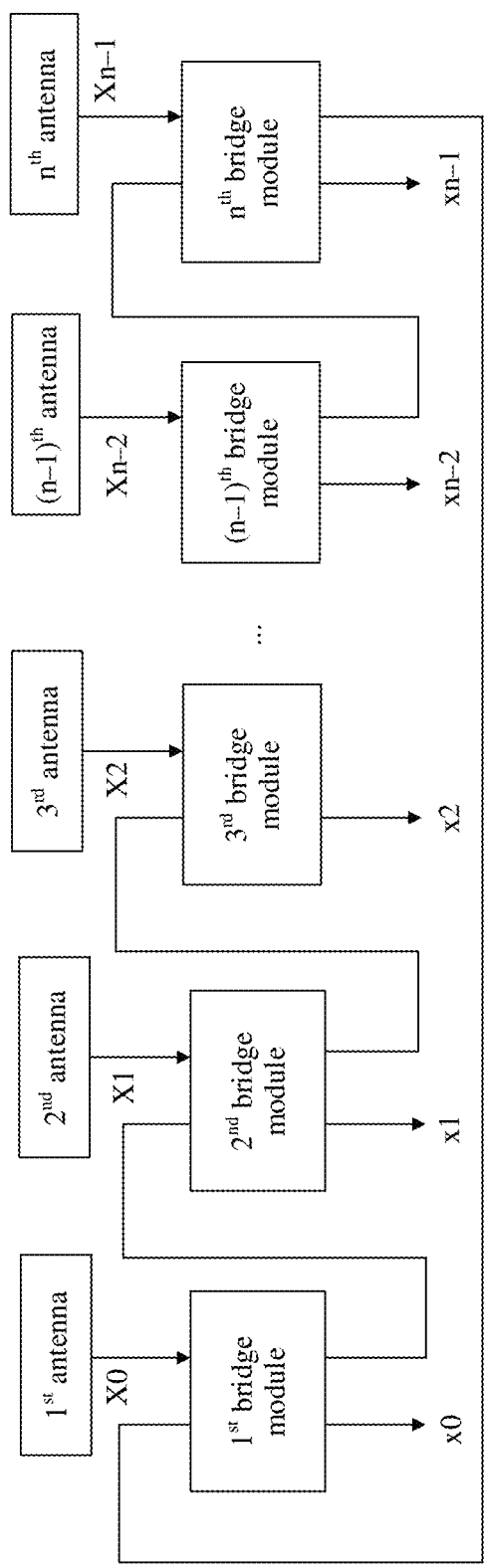
FIG. 1F is a schematic diagram of a scenario in which an antenna system receives an analog signal according to an embodiment of this application.

FIG. 1F is a schematic diagram of a scenario in which an antenna system receives an analog signal according to an embodiment of this application. In FIG. 1F, the bridge network 110 includes n bridge modules, a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules, and fourth ports of the n bridge modules are respectively connected to n antennas, where i is an integer greater than or equal to 2 and less than or equal to n, and n is an integer greater than or equal to 2.

The $n^{th}$ bridge module performs third weighting processing on a third analog signal input at a third port of the $n^{th}$ bridge module and a fourth analog signal input by an $n^{th}$ antenna in the n antennas to a fourth port of the $n^{th}$ bridge module, to obtain a third component and a fourth component; and the $n^{th}$ bridge module outputs the third component at a first port of the $n^{th}$ bridge module, and inputs, at the second port of the $n^{th}$ bridge module, the fourth component to the third port of the $1^{st}$ bridge module, to use the fourth component as a third analog signal of the third port of the $n^{th}$ bridge module.

A $j^{th}$ bridge module performs third weighting processing on a third analog signal input at a third port of the $j^{th}$ bridge module and a fourth analog signal input by a $j^{th}$ antenna to a fourth port of the $j^{th}$ bridge module, to obtain a third component and a fourth component; and the $j^{th}$ bridge module outputs the third component at a first port of the $j^{th}$ bridge module, and inputs, at a second port of the $j^{th}$ bridge module, the fourth component to a third port of a $(j+1)^{th}$ bridge module, to use the fourth component as a third analog signal of the third port of the $(j+1)^{th}$ bridge module, where j is an integer greater than or equal to 1 and less than n.

Analog signals received at the fourth ports of the bridge modules included in the bridge network are represented as $$\begin{bmatrix} x_0 \\ x_1 \\ x_2 \\ x_3 \\ \ldots \\ x_{n-1} \end{bmatrix},$$

and analog signals output at the first ports of the bridge modules included in the bridge network are represented as $$\begin{bmatrix} x_0 \\ x_1 \\ x_2 \\ x_3 \\ \dots \\ \dots \\ x_{n-1} \end{bmatrix}.$$

In this case, the analog signals output at the first ports of the bridge modules included in the bridge network are equal to values obtained by multiplexing the analog signals received at the fourth ports of the bridge modules of the bridge network by a third weighting matrix $Umatrix^H$. In other words, $$\begin{bmatrix} x_0 \\ x_1 \\ x_2 \\ x_3 \\ \dots \\ \dots \\ x_{n-1} \end{bmatrix} = Umatrix^H * \begin{bmatrix} X_0 \\ X_1 \\ X_2 \\ X_3 \\ \dots \\ X_{n-1} \end{bmatrix}.$$

Herein, $Umatrix^H$ is obtained by performing conjugate transposition on Umatrix.

It should be noted that, in FIG. 1F, a third analog signal of a third port of each bridge module is initially a zero signal, and then after this cycle is performed, the third analog signal of the third port of the bridge module is a component input from a second port of a bridge module connected to the third port of the bridge module to the third port of the bridge module.

In this embodiment, the bridge module includes n bridge modules. When a quantity of to-be-input analog signals is less than n, the to-be-input analog signals may be input only at corresponding ports of some bridge modules, and it may be considered that a zero signal is input to a corresponding port of a remaining bridge module.

In this embodiment, a matrix form of an internal structure of the bridge module may be $$\frac{\sqrt{2}}{2}\begin{bmatrix} 1 & j \\ 1 & -j \end{bmatrix} \text{ or } \frac{\sqrt{2}}{2}\begin{bmatrix} 1 & j \\ j & 1 \end{bmatrix}.$$

Herein, a parameter j represents an imaginary unit, an imaginary part of j is a positive integer 1, and correspondingly, an imaginary part of −j is a negative integer 1. For example, the first analog signal is input from the first port of the bridge module, and a phase of an analog signal output from the third port of the bridge module is 90 degrees earlier than a phase of an analog signal output from the third port of the bridge module. The second analog signal is input from the second port of the bridge module, and a phase of an analog signal output from the fourth port of the bridge module is 90 degrees earlier than a phase of an analog signal output from the third port of the bridge module.

Figure 1G:
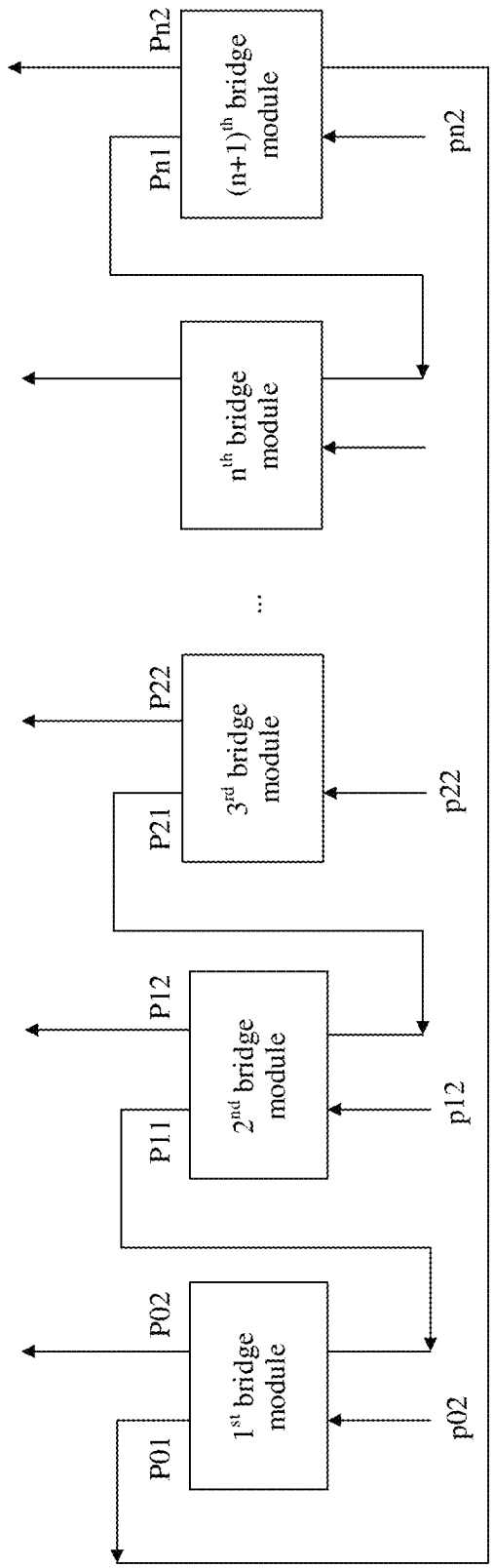
FIG. 1G is a schematic diagram of a scenario of a bridge network according to an embodiment of this application.

The following describes a derivation process of $$U_{matrix} = \frac{1}{\sqrt{2}}\left(S - \frac{D*S}{(\sqrt{2}*S - D*S)}\right)$$

with reference to FIG. 1G. Referring to FIG. 1G, the following formula may be obtained.

$$\begin{bmatrix} P01 \\ P02 \end{bmatrix} = \begin{bmatrix} 1 & j \\ 1 & -j \end{bmatrix}\begin{bmatrix} 1 & 0 \\ 0 & e^{-i(2\pi\delta_0)} \end{bmatrix}\begin{bmatrix} p02 \\ p11 \end{bmatrix}.$$

Herein, $$V = \begin{bmatrix} 1 & j \\ 1 & -j \end{bmatrix}$$

is defined. In this case, a relationship between output signals of a third port and a fourth port of each bridge module in FIG. 1G and input signals of a first port and a second port of the bridge module may be learned of. For example, in FIG. 1G, output signals of a third port and a fourth port of a $2^{nd}$ bridge module are $$\begin{bmatrix} P11 \\ P12 \end{bmatrix} = V\begin{bmatrix} 1 & 0 \\ 0 & e^{-i(2\pi\delta_1)} \end{bmatrix}\begin{bmatrix} p12 \\ p21 \end{bmatrix},$$

and output signals of a third port and a fourth port of an $(n+1)^{th}$ bridge module are $$\begin{bmatrix} Pn1 \\ Pn2 \end{bmatrix} = V\begin{bmatrix} 1 & 0 \\ 0 & e^{-i(2\pi\delta_n)} \end{bmatrix}\begin{bmatrix} pn1 \\ P01 \end{bmatrix}.$$

Based on the output signals of the third port and the fourth port of each bridge module in FIG. 1G, the following formula may be obtained:

$$\begin{bmatrix} P01 \\ P02 \\ P11 \\ P12 \\ \dots \\ Pn1 \\ Pn2 \end{bmatrix} = \begin{bmatrix} V & 0 & \dots & 0 \\ 0 & V & 0 & 0 \\ \dots & 0 & \dots & \dots \\ 0 & \dots & 0 & V \end{bmatrix}\begin{bmatrix} e^{-i(2\pi\delta_0)} & 0 & \dots & 0 \\ 0 & e^{-i(2\pi\delta_1)} & \dots & \dots \\ \dots & \dots & \dots & 0 \\ 0 & 0 & \dots & e^{-i(2\pi\delta_n)} \end{bmatrix}\begin{bmatrix} p02 \\ P11 \\ p12 \\ P21 \\ \dots \\ pn1 \\ P01 \end{bmatrix} \quad (1)$$

Based on Formula (1), it may be learned that $$\begin{bmatrix} P01 \\ P02 \\ P11 \\ P12 \\ \dots \\ Pn1 \\ Pn2 \end{bmatrix} =$$

$$\begin{bmatrix} V & 0 & \dots & 0 \\ 0 & V & 0 & 0 \\ \dots & 0 & \dots & \dots \\ 0 & \dots & 0 & V \end{bmatrix}\begin{bmatrix} e^{-i(2\pi\delta_0)} & 0 & \dots & 0 \\ 0 & e^{-i(2\pi\delta_1)} & \dots & \dots \\ \dots & \dots & \dots & 0 \\ 0 & 0 & \dots & e^{-i(2\pi\delta_n)} \end{bmatrix}\left(\begin{bmatrix} p02 \\ 0 \\ p12 \\ 0 \\ \dots \\ pn1 \\ 0 \end{bmatrix} + \begin{bmatrix} 0 \\ P11 \\ 0 \\ P21 \\ \dots \\ 0 \\ P01 \end{bmatrix}\right).$$

$$T = \begin{bmatrix} V & 0 & \ldots & 0 \\ 0 & V & 0 & 0 \\ \ldots & 0 & \ldots & \ldots \\ 0 & \ldots & 0 & V \end{bmatrix} \begin{bmatrix} e^{-i(2\pi\delta 0)} & 0 & \ldots & 0 \\ 0 & e^{-i(2\pi\delta 1)} & \ldots & \ldots \\ \ldots & \ldots & \ldots & 0 \\ 0 & 0 & \ldots & e^{-i(2\pi\delta n)} \end{bmatrix}$$

is defined, and it may be learned that $$\begin{bmatrix} P01 \\ P02 \\ P11 \\ P12 \\ \ldots \\ Pn1 \\ Pn2 \end{bmatrix} = T * \left( \begin{bmatrix} p02 \\ 0 \\ p12 \\ 0 \\ \ldots \\ pn1 \\ 0 \end{bmatrix} + \begin{bmatrix} 0 \\ P11 \\ 0 \\ P21 \\ \ldots \\ 0 \\ P01 \end{bmatrix} \right), \text{ and}$$

$$\begin{bmatrix} P01 \\ P02 \\ P11 \\ P12 \\ \ldots \\ Pn1 \\ Pn2 \end{bmatrix} - T * \begin{bmatrix} 0 \\ P11 \\ 0 \\ P21 \\ \ldots \\ 0 \\ P01 \end{bmatrix} = T * \begin{bmatrix} p02 \\ 0 \\ p12 \\ 0 \\ \ldots \\ pn1 \\ 0 \end{bmatrix}. \; R = \begin{bmatrix} 0 & 0 \\ 1 & 0 \end{bmatrix}$$

is defined, and
it may be learned that $$\begin{bmatrix} 0 \\ P11 \\ 0 \\ P21 \\ \ldots \\ 0 \\ P01 \end{bmatrix} = \begin{bmatrix} 0 & 0 & 0 & 0 & 0 & \ldots & 0 & 0 \\ 0 & 0 & 1 & 0 & 0 & \ldots & 0 & 0 \\ 0 & 0 & 0 & 0 & 1 & \ldots & 0 & 0 \\ 0 & 0 & 0 & 0 & 0 & \ldots & 0 & 0 \\ 0 & 0 & 0 & 0 & 0 & \ldots & 0 & 0 \\ 0 & 0 & 0 & 0 & 0 & \ldots & 1 & 0 \\ 0 & 0 & 0 & 0 & 0 & \ldots & 0 & 0 \\ 1 & 0 & 0 & 0 & 0 & \ldots & 0 & 0 \end{bmatrix} \begin{bmatrix} P01 \\ P02 \\ P11 \\ P12 \\ \ldots \\ Pn1 \\ Pn2 \end{bmatrix} = \begin{bmatrix} 0 & R & 0 & \ldots & 0 \\ 0 & 0 & R & \ldots & 0 \\ 0 & 0 & 0 & \ldots & 0 \\ 0 & 0 & 0 & \ldots & R \\ R & 0 & 0 & \ldots & 0 \end{bmatrix} \begin{bmatrix} P01 \\ P02 \\ P11 \\ P12 \\ \ldots \\ Pn1 \\ Pn2 \end{bmatrix}.$$

It can be learned from this that $$\left( E - T^* \begin{bmatrix} 0 & R & 0 & \ldots & 0 \\ 0 & 0 & R & \ldots & 0 \\ 0 & 0 & 0 & \ldots & 0 \\ 0 & 0 & 0 & \ldots & R \\ R & 0 & 0 & \ldots & 0 \end{bmatrix} \right) * \begin{bmatrix} P01 \\ P02 \\ P11 \\ P12 \\ \ldots \\ Pn1 \\ Pn2 \end{bmatrix} = T * \begin{bmatrix} p02 \\ 0 \\ p12 \\ 0 \\ \ldots \\ pn1 \\ 0 \end{bmatrix}.$$

Therefore, the following formula is obtained:

$$\begin{bmatrix} P01 \\ P02 \\ P11 \\ P12 \\ \ldots \\ Pn1 \\ Pn2 \end{bmatrix} = \left( E - T^* \begin{bmatrix} 0 & R & 0 & \ldots & 0 \\ 0 & 0 & R & \ldots & 0 \\ 0 & 0 & 0 & \ldots & 0 \\ 0 & 0 & 0 & \ldots & R \\ R & 0 & 0 & \ldots & 0 \end{bmatrix} \right)^{-1} * T * \begin{bmatrix} p02 \\ 0 \\ p12 \\ 0 \\ \ldots \\ pn1 \\ 0 \end{bmatrix}. \quad (2)$$

Because each quantity on a right side of an equation in formula (2) is a known quantity, input signals that are of first ports of bridge modules in the bridge network and that are extracted from Formula (2) are $$\begin{bmatrix} p02 \\ p12 \\ p22 \\ p32 \\ \ldots \\ pn1 \\ pn2 \end{bmatrix},$$

and extracted output signals of fourth ports of the bridge modules in the bridge network are $$\begin{bmatrix} P02 \\ P12 \\ P22 \\ P32 \\ \ldots \\ \ldots \\ Pn2 \end{bmatrix}.$$

In this case, the following formula may be obtained through calculation:

$$\begin{bmatrix} P02 \\ P12 \\ P22 \\ P32 \\ \ldots \\ \ldots \\ Pn2 \end{bmatrix} = U_{matrix} * \begin{bmatrix} p02 \\ p12 \\ p22 \\ p32 \\ \ldots \\ pn1 \\ pn2 \end{bmatrix}.$$

Therefore, $U_{matrix}$ is obtained.

Optionally, in this embodiment of this application, as shown in FIG. 1B, the antenna system further includes the digital signal processing module 140 and the digital-to-analog conversion module 150. A process in which the digital signal processing module 140 process a digital signal in a digital domain is described based on the bridge network shown in FIG. 1E.

First, in a scenario in which the antenna system in this embodiment of this application transmits an analog signal, the digital signal processing module 140 receives a first multi-path digital signal, and the first multi-path digital signal is represented as $$\begin{bmatrix} s_0 \\ s_1 \\ \ldots \\ s_{m-1} \end{bmatrix}$$

herein. The digital signal processing module 140 performs second weighting processing on the first multi-path digital signal, to obtain a second multi-path digital signal. Specifically, the second weighting processing is implemented by using a second weighting matrix. The second weighting matrix is an n*m matrix, n is the quantity of bridge modules included in the antenna system, m is a quantity of signals included in the first multi-path digital signal, and m is an integer greater than o and less than n. A specific representation is as follows: The second multi-path digital signal is $$\begin{bmatrix} S_0 \\ S_1 \\ \ldots \\ S_{m-1} \end{bmatrix} = Pmatrix * \begin{bmatrix} s_0 \\ s_1 \\ \ldots \\ s_{m-1} \end{bmatrix}.$$

The second weighting matrix is Pmatrix. Then, the digital signal processing module 140 sends the second multi-path digital signal to the digital-to-analog conversion module 150. The digital-to-analog conversion module 150 performs digital-to-analog conversion on the second multi-path digital signal, to obtain a first multi-path analog signal, and inputs the first multi-path analog signal to the bridge network 110. The first multi-path analog signal may be first analog signals input to first ports of m of the n bridge modules in the bridge network shown in FIG. 1E.

The second weighting matrix Pmatrix meets any one of the following conditions: column vectors of the second weighting matrix are orthogonal; each column vector of the second weighting matrix is orthogonal to one or more row vectors of the first weighting matrix; or the second weighting matrix is obtained by performing conjugate transposition on the first weighting matrix.

Optionally, a signal type of the first multi-path digital signal includes any one of the following: m layers of MIMO transmit signals; signals sent by m users; signals sent by m cells; or signals sent in m beam directions.

It can be learned from this that the foregoing describes the process in which the digital signal processing module 140 processes the digital signal in the digital domain, and such a manner is applicable to the following scenarios:

Weighting processing is performed on a plurality of layers of MIMO signals.

If there are signals of a plurality of users, a plurality of layers of MIMO signals, signals of a plurality of cells, or signals in a plurality of beam directions, and only a signal of a specific user, a specific layer of MIMO signal, a signal of a specific cell, or a signal in a specific beam direction needs to be sent, the digital signal processing module 140 may perform second weighting processing, to send only the signals of some users, the some layers of MIMO signals, the signals of some cells, or the signals in some beam directions.

If there is a signal of a specific user, a specific layer of MIMO signal, a signal of a specific cell, or a signal in a specific beam direction, and a signal needs to be sent to a plurality of users, a MIMO signal needs to be sent at a plurality of layers, a signal needs to be sent in a plurality of cells, or a signal needs to be sent in a plurality of beam directions, the digital signal processing module 140 performs second weighting processing, to send the signal to the plurality of users, send the MIMO signal at the plurality of layers, send the signal in the plurality of cells, or send the signal in the plurality of beam directions.

In a scenario in which the antenna system in this embodiment of this application receives an analog signal, as shown in FIG. 1B, the antenna system further includes the digital signal processing module 140 and the digital-to-analog conversion module 150. The process in which the digital signal processing module 140 process the digital signal in the digital domain is described based on the bridge network shown in FIG. 1F.

The digital-to-analog conversion module 150 receives a second multi-path analog signal sent by the bridge network 110; and performs digital-to-analog conversion on the second multi-path analog signal, to obtain a third multi-path digital signal. The digital signal processing module 140 receives a third multi-path digital signal sent by the bridge network 110, and performs fourth weighting processing on the third multi-path digital signal, to obtain a fourth multi-path digital signal. The third multi-path digital signal is represented as $$\begin{bmatrix} Y_0 \\ Y_1 \\ \ldots \\ Y_{m-1} \end{bmatrix},$$

the third multi-path digital signal include m signals, and m is an integer greater than or equal to 1 and less than or equal to n. Therefore, the fourth multi-path digital signal is $$\begin{bmatrix} y_0 \\ y_1 \\ \ldots \\ y_{m-1} \end{bmatrix} = Pmatrix^H * \begin{bmatrix} Y_0 \\ Y_1 \\ \ldots \\ Y_{m-1} \end{bmatrix}.$$

Herein, $Pmatrix^H$ is a fourth weighting matrix, the fourth weighting matrix is an m*n matrix, and $Pmatrix^H$ is obtained by performing conjugate transposition on Pmatrix.

The fourth weighting matrix meets any one of the following conditions: row vectors of the fourth weighting matrix are orthogonal; each row vector of the fourth weighting matrix is orthogonal to one or more column vectors of the third weighting matrix; or the fourth weighting matrix is obtained by performing conjugate transposition on the third weighting matrix.

Optionally, a signal type of the third multi-path digital signal includes any one of the following: m layers of MIMO receive signals; signals received by m users; signals received by m cells; or signals received in m beam directions.

Optionally, each bridge module is an intra-band combiner (also referred to as a 90-degree bridge), a matrix form of the intra-band combiner may be represented as $$\frac{\sqrt{2}}{2}\begin{bmatrix} 1 & j \\ 1 & -j \end{bmatrix} \text{ or } \frac{\sqrt{2}}{2}\begin{bmatrix} 1 & j \\ j & 1 \end{bmatrix}.$$

Herein, a parameter j represents an imaginary unit, an imaginary part of j is a positive integer 1, and correspondingly, an imaginary part of −j is a negative integer 1.

It can be understood that the intra-band combiner changes an amplitude value of an analog signal, to change a power value of the analog signal. The bridge module included in the bridge network 110 may also be another bridge device that can implement the foregoing functions. In addition, a composition form of the bridge module in the bridge network 110 does not constitute a limitation on a structure of the bridge network 110, and the bridge network 110 may include another bridge device.

Because a wavelength trip of an electromagnetic wave that is generated by the analog signal and that is transmitted in the microstrip has a corresponding phase, different wavelength trips have different phases, and the phase affects a value of an output component of the bridge module. Therefore, in the bridge network provided in this embodiment of this application, a length of a connection line connected between the n bridge modules may be adjusted, to control a proportion of an output component of the bridge module included in the bridge network, so as to implement power allocation between antenna signals, and implement power sharing between antenna signals.

Optionally, in this embodiment of this application, the foregoing describes a function of the control module 130 by using the bridge network shown in FIG. 1C as an example. The control module 130 is configured to control a first line length and a second line length. In a scenario in which the antenna system in this embodiment of this application transmits an analog signal, the first line length and the second line length are used to control a proportion value of an output signal at a fourth port of a first bridge module to an output signal at a fourth port of a second bridge module. In a scenario in which the antenna system in this embodiment of this application receives an analog signal, the first line length and the second line length are used to control a proportion value of an output signal at a first port of a first bridge module to an output signal at a first port of a second bridge module.

Specifically, the control module 130 controls a length of a microstrip of a first phase shifter to control the first line length, and controls a length of a microstrip of a second phase shifter to control the second line length. One terminal of the first phase shifter is connected to a second port of the first bridge module, the other terminal of the first phase shifter is connected to a third port of the second bridge module, one terminal of the second phase shifter is connected to a third port of the first bridge module, and the other terminal of the second phase shifter is connected to a second port of the second bridge module.

Figure 2A:
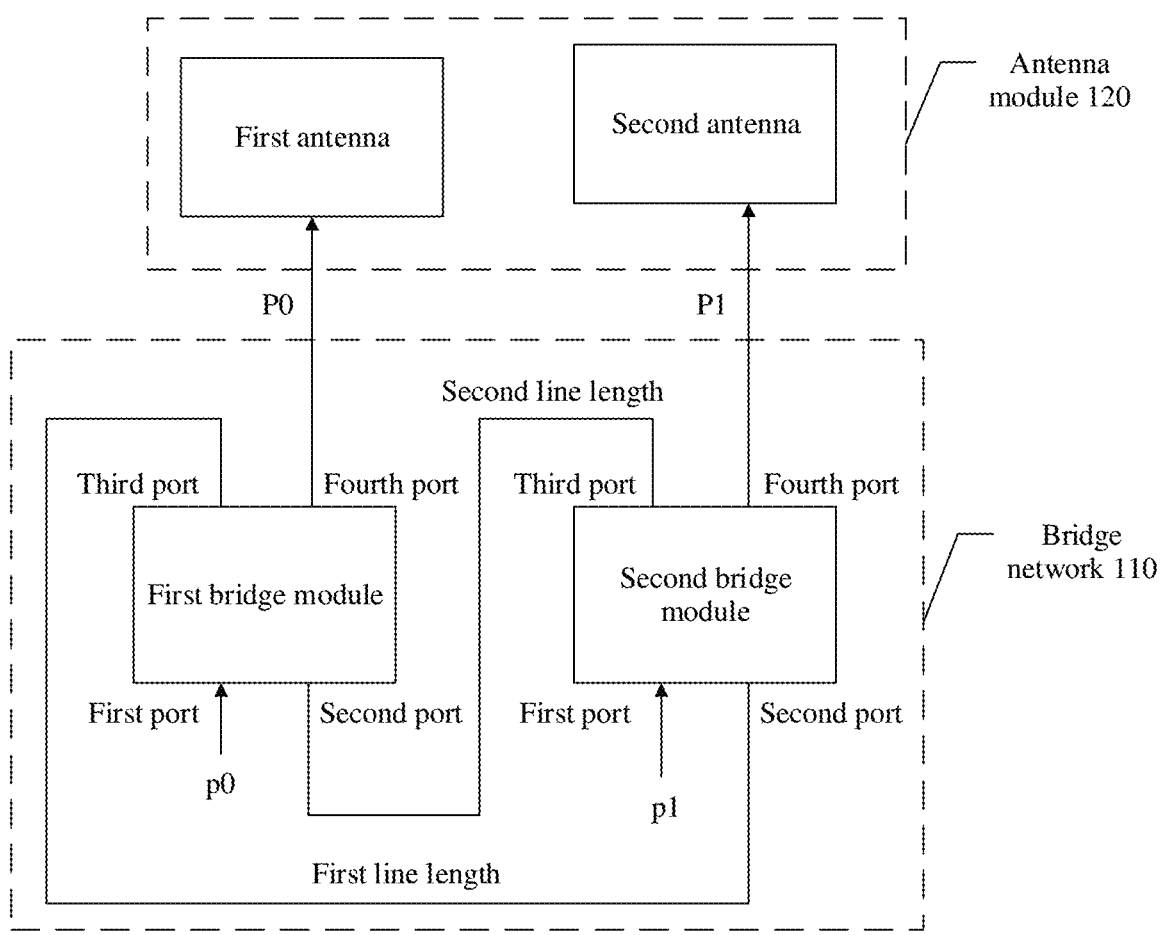
FIG. 2A is a schematic diagram of another scenario in which an antenna system transmits an analog signal according to an embodiment of this application.

The following shows an example in which the bridge network in this embodiment of this application includes the first bridge module and the second bridge module. As shown in FIG. 2A, it can be learned that output signals of fourth ports of bridge modules in the bridge network are represented as $$\begin{bmatrix} P_0 \\ P_1 \end{bmatrix},$$

and input signals of first ports of bridge modules in the bridge network are represented as $$\begin{bmatrix} p_0 \\ p_1 \end{bmatrix}.$$

In this case, it can be learned that $$\begin{bmatrix} P_0 \\ P_1 \end{bmatrix} = U_{matrix} * \begin{bmatrix} p_0 \\ p_1 \end{bmatrix},$$

and the first weighting matrix is $$U_{matrix} = \frac{1}{\sqrt{2}}\left(S - \frac{D*S}{(\sqrt{2}*S - D*S)}\right).$$

Because the bridge network includes two bridge modules, it can be learned that $$S = \begin{bmatrix} 0 & 1 \\ 1 & 0 \end{bmatrix} \text{ and } D = \begin{bmatrix} e^{-i(2\pi\delta 0)} & 0 \\ 0 & e^{-i(2\pi\delta 1)} \end{bmatrix}.$$

Herein, $\delta_0$ is a wavelength trip corresponding to a second line length between the second port of the first bridge module and the third port of the second bridge module, and $\delta_1$ is a wavelength trip corresponding to a first line length between the second port of the second bridge module and the third port of the first bridge module.

Figure 2B:
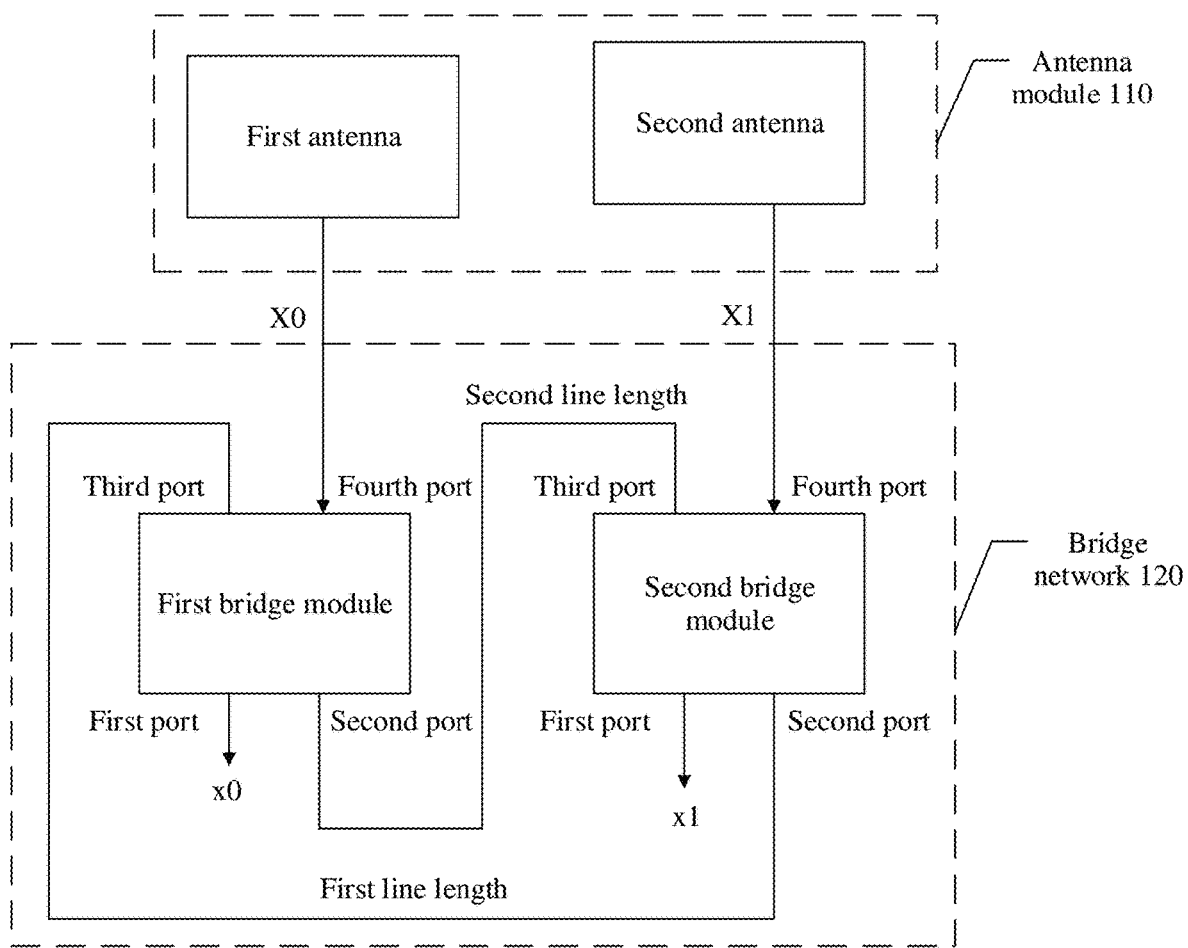
FIG. 2B is a schematic diagram of another scenario in which an antenna system receives an analog signal according to an embodiment of this application.

In a case in which the antenna system provided in this embodiment of this application receives an analog signal, as shown in FIG. 2B, it can be learned that analog signals received at fourth ports of bridge modules in the bridge network are represented as $$\begin{bmatrix} X_0 \\ X_1 \end{bmatrix},$$

and output signals of first ports of the bridge modules in the bridge network are represented as $$\begin{bmatrix} x_0 \\ x_1 \end{bmatrix}.$$

In this case, it can be learned that $$\begin{bmatrix} x_0 \\ x_1 \end{bmatrix} = Umatrix^H * \begin{bmatrix} X_0 \\ X_1 \end{bmatrix}, U_{matrix} = \frac{1}{\sqrt{2}}\left(S - \frac{D*S}{(\sqrt{2}*S - D*S)}\right),$$

$$S = \begin{bmatrix} 0 & 1 \\ 1 & 0 \end{bmatrix}, \text{ and } D = \begin{bmatrix} e^{-i(2\pi\delta 0)} & 0 \\ 0 & e^{-i(2\pi\delta 1)} \end{bmatrix}.$$

Figure 3:
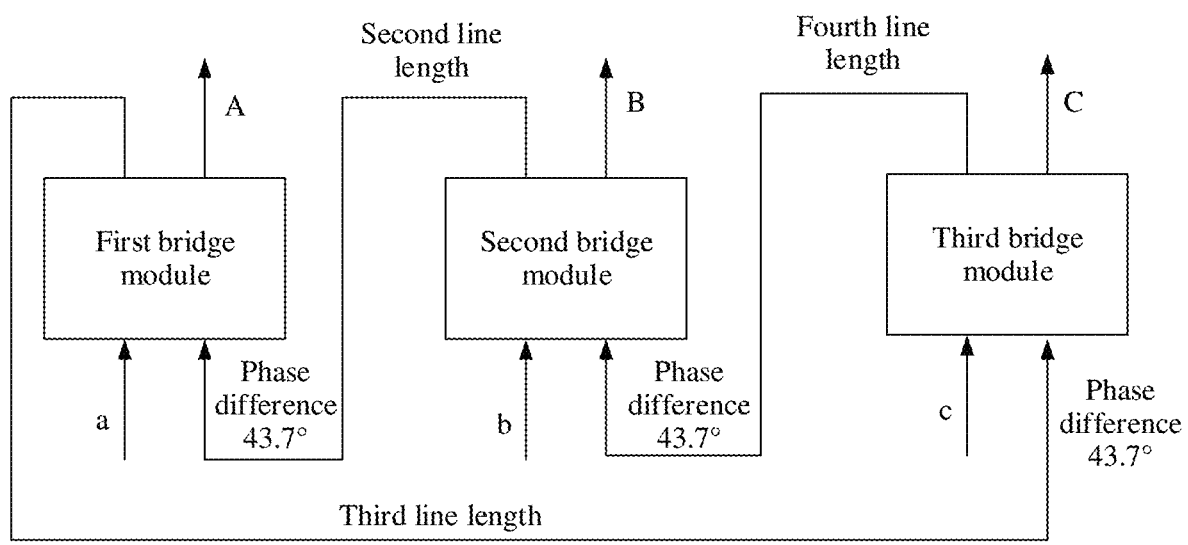
FIG. 3 is a schematic diagram of another structure of a bridge network according to an embodiment of this application.
Figure 4:
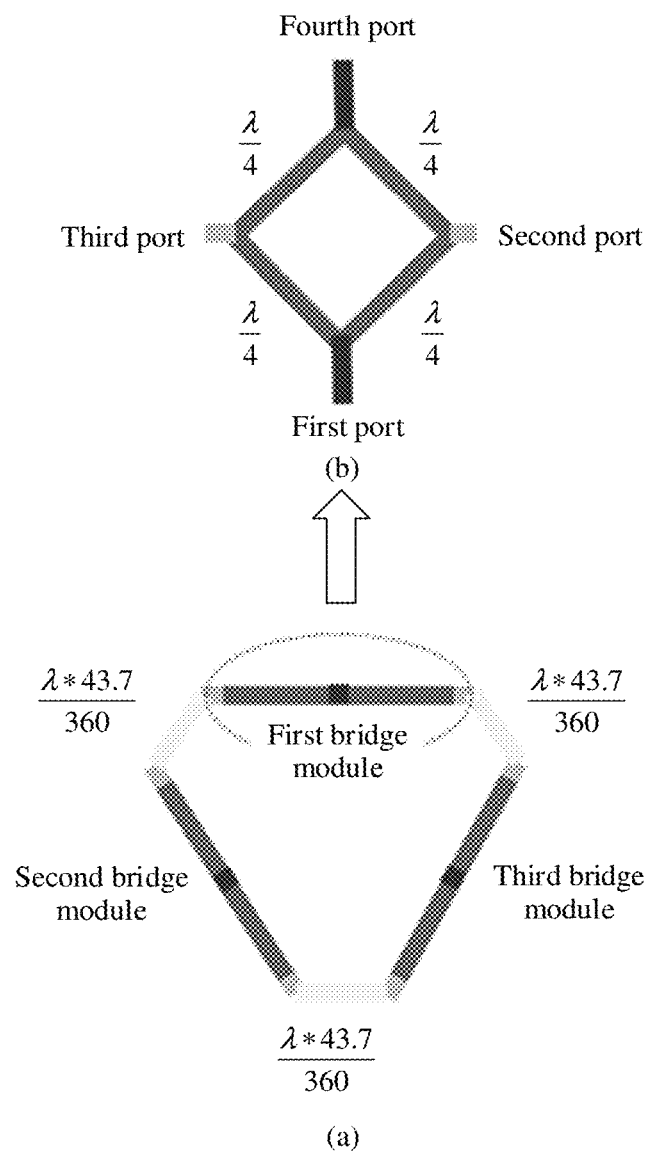
FIG. 4 is a schematic diagram of another structure of a bridge network according to an embodiment of this application.

The following shows two possible structures of a three-input three-output bridge network by using FIG. 3 and FIG. 4.

FIG. 3 is a schematic diagram of a structure of a bridge network according to an embodiment of this application. The bridge network includes a first bridge module, a second bridge module, and a third bridge module. A third port of the first bridge module is connected to a second port of the third bridge module, a third port of the third bridge module is connected to a second port of the second bridge module, and a third port of the second bridge module is connected to a second port of the first bridge module. A phase difference existing when an analog signal passes through connection lines between bridge modules is 43.7 degrees.

FIG. 4 is a schematic diagram of another structure of a bridge network according to an embodiment of this application. The bridge network is a three-dimensional bridge apparatus. A bridge network 110 includes a first bridge module, a second bridge module, and a third bridge module. FIG. 4(*a*) is a top view of a three-dimensional diagram of a bridge network. The three bridge modules are connected by using a microstrip, and a line length of the microstrip is $$\frac{43.7°}{360°}$$

of a carrier medium wavelength, to form an annular circular circuit. A front view of the first bridge module is shown in an upper part shown in FIG. 4(*b*).

To evenly output, to corresponding antennas through fourth ports of the three bridge modules, analog signals input to the three bridge modules, in other words, to make a proportion of output components of bridge modules in the bridge network close to 1:1, $\delta_0$, $\delta_1$, and $\delta_2$ are all set to $$\frac{43.7°}{180°}.$$

Herein, $\delta_0$ is a wavelength trip corresponding to a line length of a connection line between a second port of the first bridge module and a third port of the second bridge module, $\delta_1$ is a wavelength trip corresponding to a line length of a connection line between a second port of the second bridge module and a third port of the third bridge module, and $\delta_2$ is a wavelength trip corresponding to a line length of a connection line between a second port of the third bridge module and a third port of the first bridge module.

An analog signal a is input to a first port of the first bridge module, an analog signal b is input to a first port of the second bridge module, and an analog signal c is input to a first port of the third bridge module. In this case, it can be learned that an analog signal A is output to a fourth port of the first bridge module, an analog signal B is output to a fourth port of the second bridge module, and an analog signal C is output to a fourth port of the third bridge module. In this case, it can be learned that $$\begin{bmatrix}A\\B\\C\end{bmatrix} = Umatrix * \begin{bmatrix}a\\b\\c\end{bmatrix}, U_{matrix} = \frac{1}{\sqrt{2}}\left(S - \frac{D*S}{(\sqrt{2}*S - D*S)}\right),$$

$$S = \begin{bmatrix}0 & 1 & 0\\0 & 0 & 1\\1 & 0 & 0\end{bmatrix}, \text{ and } D = \begin{bmatrix}e^{-i(2\pi\delta 0)} & 0 & 0\\0 & e^{-i(2\pi\delta 1)} & 0\\0 & 0 & e^{-i(2\pi\delta 2)}\end{bmatrix}.$$

Because $\delta_0$, $\delta_1$, and $\delta_2$ are all $$\frac{43.7°}{180°},$$

it can be learned through calculation that $$Umatix = \begin{bmatrix}0.6060 & 0.6495 & 0.4593\\0.4593 & 0.6060 & 0.6495\\0.6495 & 0.4593 & 0.6060\end{bmatrix} *$$

$$\exp\left(j*\begin{bmatrix}-27.2682 & -28.6860 & 105.0340\\105.0340 & -27.2682 & -28.6860\\-28.6860 & 105.0340 & -27.2682\end{bmatrix}\right).$$

Therefore, A, B, and C can be calculated.

A process in which a digital signal processing module 140 in this embodiment of this application processes a received digital signal is described below by using a scenario in which the digital signal processing module 140 of the bridge network shown in FIG. 3 or FIG. 4 processes an analog signal a, an analog signal b, and an analog signal c.

The digital signal processing module 140 receives a digital signal $a_c$ of a first cell, a digital signal $b_c$ of a second cell, and a digital signal $C_c$ of a third cell. The digital signal processing module 140 performs signal processing on $a_c$, $b_c$, and $c_c$, for example, multiplies the digital signals by a matrix obtained by performing conjugate transposition on a first weighting matrix. Details are as follows:

$$\begin{bmatrix}a_d\\b_d\\c_d\end{bmatrix} = Umatrx^H * \begin{bmatrix}a_c\\b_c\\c_c\end{bmatrix},$$

where $Umatrix^H$ is obtained by performing conjugate transposition on $U_{matrix}$.

Optionally, $a_c$, $b_c$, and $c_c$ are signals of the three cells. If only a signal of the first cell is sent, signal power of the second cell and the third cell may be shared with the first cell. For example, three times of power amplification are performed on a first column vector of $Umatrix^H$, or a power level of a digital signal of the first cell is not limited within 1, and an amplitude of $a_c$ may be amplified by $\sqrt{3}$ times. In this case, three digital signals may be represented as $$\begin{bmatrix}a_c\\b_c\\c_c\end{bmatrix} = \sqrt{3} * \begin{bmatrix}a_c\\0\\0\end{bmatrix}.$$

Then, a digital-to-analog conversion module 150 performs digital-to-analog conversion on the three processed digital signals, which may be specifically represented as follows:

$$\begin{bmatrix}a\\b\\c\end{bmatrix} = P\left(\begin{bmatrix}a_d\\b_d\\c_d\end{bmatrix}\right) = \begin{bmatrix}P_A & 0 & 0\\0 & P_B & 0\\0 & 0 & P_C\end{bmatrix}\begin{bmatrix}a_d\\b_d\\c_d\end{bmatrix}$$

Because power (an average value) of the digital signal does not exceed 1, $$\begin{bmatrix}P_A & 0 & 0\\0 & P_B & 0\\0 & 0 & P_C\end{bmatrix}$$

indicates energy or a rated power level carried by each signal after digital-to-analog conversion. Herein, specifications of devices used for the three signals are the same, and rated power levels carried by the three signals are uniformly $P_A$. Therefore, $$\begin{bmatrix}a\\b\\c\end{bmatrix} = P_A\begin{bmatrix}a_d\\b_d\\c_d\end{bmatrix}.$$

Therefore, it can be learned from the foregoing that $$\begin{bmatrix}a_d\\b_d\\c_d\end{bmatrix} = Umatrx^H * \begin{bmatrix}a_c\\b_c\\c_c\end{bmatrix}.$$

Therefore, $$\begin{bmatrix}a\\b\\c\end{bmatrix} = P_A * Umatrx^H * \sqrt{3} * \begin{bmatrix}a_c\\0\\0\end{bmatrix}.$$

Therefore, the analog signals a, b, and c pass through the bridge network shown in FIG. 3 or FIG. 4, and output signals output at fourth ports of bridge modules in the bridge network are $$\begin{bmatrix} A \\ B \\ C \end{bmatrix} = Umatrx * P_A * Umatrx^H * \sqrt{3} * \begin{bmatrix} a_c \\ 0 \\ 0 \end{bmatrix} = \sqrt{3} * P_A * a_c.$$

It can be learned from this that, an amplitude of an analog signal sent in the first cell (namely, a first antenna) is increased by $\sqrt{3}$ times, and in this way, available power of the analog signal in the first cell is increased by three times.

An embodiment of this application further provides an access network device. The access network device includes the antenna system shown in FIG. 1B or FIG. 1D. The antenna system is configured to perform embodiments shown in FIG. 1E, FIG. 1F, FIG. 2A, FIG. 2B, FIG. 3, and FIG. 4. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antenna system comprising, wherein the antenna system comprises
a bridge network comprising n bridge modules wherein a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules; and
an antenna module comprising n antennas, wherein fourth ports of the n bridge modules are respectively connected to the n antennas, wherein i is an integer greater than or equal to 2 and less than or equal to n, and wherein n is an integer greater than or equal to 2;
wherein the $1^{st}$ bridge module in the n bridge modules performs first weighting processing on a first analog signal input at a first port of the $1^{st}$ bridge module and a second analog signal input at a second port of the $1^{st}$ bridge module, to obtain a first component and a second component, and the $1^{st}$ bridge module outputs the first component at a fourth port of the $1^{st}$ bridge module, and inputs, at the third port of the $1^{st}$ bridge module, the second component to the second port of the $n^{th}$ bridge module in the n bridge modules, to use the second component as a second analog signal of the second port of the $n^{th}$ bridge module; and
a $k^{th}$ bridge module in the n bridge modules performs first weighting processing on a first analog signal input at a first port of the $k^{th}$ bridge module and a second analog signal input at a second port of the $k^{th}$ bridge module, to obtain a first component and a second component, and the $k^{th}$ bridge module outputs the first component at a fourth port of the $k^{th}$ bridge module, and inputs, at a third port of the $k^{th}$ bridge module, the second component to a second port of a $(k-1)^{th}$ bridge module in the n bridge modules, to use the second component as a second analog signal of the second port of the $(k-1)^{th}$ bridge module, wherein k is an integer greater than 1 and less than or equal to n.

2. The antenna system according to claim 1, wherein $$\begin{bmatrix} P_0 \\ P_1 \\ P_2 \\ P_3 \\ \vdots \\ \vdots \\ P_{n-1} \end{bmatrix} = Umatrix * \begin{bmatrix} p0 \\ p1 \\ p2 \\ p3 \\ \vdots \\ \vdots \\ p_{n-1} \end{bmatrix}, \begin{bmatrix} P_0 \\ P_1 \\ P_2 \\ P_3 \\ \vdots \\ \vdots \\ P_{n-1} \end{bmatrix}$$

is a matrix comprising a sum of output components of fourth ports of all of the n bridge modules, a first weighting matrix is $$Umatrix = \frac{1}{\sqrt{2}} \left( S - \frac{D*S}{(\sqrt{2}*S - D*S)} \right), S = \begin{bmatrix} 0 & 1 & 0 & \ldots \\ \ldots & 0 & \ldots & \ldots \\ 0 & \ldots & \ldots & 1 \\ 1 & 0 & 0 & 0 \end{bmatrix},$$

S is an n*n matrix, $$D = \begin{bmatrix} e^{-i(2\pi\delta_0)} & 0 & \ldots & 0 \\ 0 & e^{-i(2\pi\delta_1)} & \ldots & \ldots \\ \ldots & \ldots & \ldots & 0 \\ 0 & 0 & \ldots & e^{-i(2\pi\delta_{n-1})} \end{bmatrix},$$

D is an n*n matrix, $e^{-i(x)}$ is a complex exponential function whose base is a natural number e, $\delta_0$ is a wavelength trip corresponding to a line length of a connection line between the second port of the $1^{st}$ bridge module of the bridge network and a third port of a bridge module connected to the second port of the $1^{st}$ bridge module, $\delta_1$ is a wavelength trip corresponding to a line length of a connection line between a second port of a $2^{nd}$ bridge module of the bridge network and a third port of a bridge module connected to the second port of the $2^{nd}$ bridge module, $\delta_{n-1}$ is a wavelength trip corresponding to a line length of a connection line between the second port of the $n^{th}$ bridge module of the bridge network and a third port of a bridge module connected to the second port of the $n^{th}$ bridge module, and $$\begin{bmatrix} p0 \\ p1 \\ p2 \\ p3 \\ \vdots \\ \vdots \\ p_{n-1} \end{bmatrix}$$

is a matrix comprising a first analog signal of a first port of each of the n bridge modules.

3. The antenna system according to claim 1, wherein the antenna system further comprises a control module, wherein the control module is configured to set a line length of a connection line between the n bridge modules, and wherein the line length of the connection line between the n bridge modules is used to control a proportion value of output signals of first ports of the n bridge modules.

4. The antenna system according to claim 2, wherein the antenna system further comprises a digital signal processing module and a digital-to-analog conversion module, the digital signal processing module is connected to a first terminal of the digital-to-analog conversion module, and a second terminal of the digital-to-analog conversion module is connected to the bridge network;
- wherein the digital signal processing module is configured to perform second weighting processing on a first multi-path digital signal received by the digital signal processing module, to obtain a second multi-path digital signal, wherein the second weighting processing is implemented by using a second weighting matrix, the second weighting matrix is an n*m matrix, n is a quantity of bridge modules comprised in the antenna system, m is a quantity of signals comprised in the first multi-path digital signal, and m is an integer greater than o and less than or equal to n;
- wherein the second weighting matrix meets any one of the following conditions:
    - column vectors of the second weighting matrix are orthogonal;
    - each column vector of the second weighting matrix is orthogonal to one or more row vectors of the first weighting matrix; or
    - the second weighting matrix is obtained by performing conjugate transposition on the first weighting matrix; and
- wherein the digital-to-analog conversion module is configured to perform digital-to-analog conversion on the second multi-path digital signal, to obtain a first multi-path analog signal, wherein the first multi-path analog signal comprises a first analog signal of a first port of m of the n bridge modules.

5. The antenna system according to claim 4, wherein the first multi-path digital signal comprises:
- m layers of multiple-input multiple-output (MIMO) transmit signals;
- signals sent by m users;
- signals sent by m cells; or
- signals sent in m beam directions.

6. The antenna system according to claim 1, wherein each bridge module is an intra-band combiner.

7. An antenna system comprising: wherein the antenna system comprises a bridge network, wherein the bridge network comprises n bridge modules, a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules; and
- an antenna module, wherein the antenna module comprises n antennas, wherein fourth ports of the n bridge modules are respectively connected to the n antennas, wherein i is an integer greater than or equal to 2 and less than or equal to n, and wherein n is an integer greater than or equal to 2;
- wherein the $n^{th}$ bridge module in the n bridge modules performs third weighting processing on a third analog signal input at a third port of the $n^{th}$ bridge module and a fourth analog signal input by an $n^{th}$ antenna in the n antennas to a fourth port of the $n^{th}$ bridge module, to obtain a third component and a fourth component, and the $n^{th}$ bridge module outputs the third component at a first port of the $n^{th}$ bridge module, and inputs, at a second port of the $n^{th}$ bridge module, the fourth component to the third port of the $1^{st}$ bridge module, to use the fourth component as a third analog signal of the third port of the $n^{th}$ bridge module; and
- wherein a $j^{th}$ bridge module in the n bridge modules performs third weighting processing on a third analog signal input at a third port of the $j^{th}$ bridge module and a fourth analog signal input by a $j^{th}$ antenna to a fourth port of the $j^{th}$ bridge module, to obtain a third component and a fourth component, and the $j^{th}$ bridge module outputs the third component at a first port of the $j^{th}$ bridge module, and inputs, at a second port of the $j^{th}$ bridge module, the fourth component to a third port of a $(j+1)^{th}$ bridge module, to use the fourth component as a third analog signal of the third port of the $(j+1)^{th}$ bridge module, wherein j is an integer greater than or equal to 1 and less than n.

8. The antenna system according to claim 7, wherein $$\begin{bmatrix} x0 \\ x1 \\ x2 \\ x3 \\ \cdots \\ \cdots \\ x_{n-1} \end{bmatrix} = Umatrix^H * \begin{bmatrix} X_0 \\ X_1 \\ X_2 \\ X_3 \\ \cdots \\ \cdots \\ X_{n-1} \end{bmatrix}, \begin{bmatrix} x0 \\ x1 \\ x2 \\ x3 \\ \cdots \\ \cdots \\ x_{n-1} \end{bmatrix}$$

is a matrix comprising a sum of output components of first ports of all of the n bridge modules, a third weighting matrix $Umatrix^H$ is obtained by performing conjugate transposition on Umatrix $$Umatrix = \frac{1}{\sqrt{2}}\left(S - \frac{D*S}{(\sqrt{2}*S - D*S)}\right), S = \begin{bmatrix} 0 & 1 & 0 & \cdots \\ \cdots & 0 & \cdots & \cdots \\ 0 & \cdots & \cdots & 1 \\ 1 & 0 & 0 & 0 \end{bmatrix},$$

S is an n*n matrix, $$D = \begin{bmatrix} e^{-i(2\pi\delta_0)} & 0 & \cdots & 0 \\ 0 & e^{-i(2\pi\delta_1)} & \cdots & \cdots \\ \cdots & \cdots & \cdots & 0 \\ 0 & 0 & \cdots & e^{-i(2\pi\delta_{n-1})} \end{bmatrix},$$

D is an n*n matrix, $e^{-i(x)}$ is a complex exponential function whose base is a natural number e, $\delta_0$ is a wavelength trip corresponding to a line length of a connection line between the second port of the $1^{st}$ bridge module of the bridge network and a third port of a bridge module connected to the second port of the $1^{st}$ bridge module, $\delta_1$ is a wavelength trip corresponding to a line length of a connection line between a second port of a $2^{nd}$ bridge module of the bridge network and a third port of a bridge module connected to the second port of the $2^{nd}$ bridge module, $\delta_{N-1}$ is a wavelength trip corresponding to a line length of a connection line between the second port of the $n^{th}$ bridge module of the bridge network and a third port of a bridge module connected to the second port of the $n^{th}$ bridge module, and $$\begin{bmatrix} X_0 \\ X_1 \\ X_2 \\ X_3 \\ \cdots \\ \cdots \\ X_{n-1} \end{bmatrix}$$

is a matrix comprising a fourth analog signal of a fourth port of each of the n bridge modules.

9. The antenna system according to claim 7, wherein the antenna system further comprises a control module, wherein the control module is configured to set a line length of a connection line between the n bridge modules, and wherein the line length of the connection line between the n bridge modules is used to control a proportion value of output signals of first ports of the n bridge modules.

10. The antenna system according to claim 8, wherein the antenna system further comprises a digital signal processing module and a digital-to-analog conversion module, the digital signal processing module is connected to a first terminal of the digital-to-analog conversion module, and a second terminal of the digital-to-analog conversion module is connected to the bridge network;

wherein the digital-to-analog conversion module is configured to receive a second multi-path analog signal sent by the bridge network, and perform digital-to-analog conversion on the second multi-path analog signal, to obtain a third multi-path digital signal; and wherein the digital signal processing module is configured to perform fourth weighting processing on the third multi-path digital signal, to obtain a fourth multi-path digital signal, wherein the fourth weighting processing is implemented by using a fourth weighting matrix, the fourth weighting matrix is an m*n matrix, m is a quantity of signals comprised in the third multi-path digital signal, and m is an integer greater than o and less than or equal to n; and the fourth weighting matrix meets any one of the following conditions:
  row vectors of the fourth weighting matrix are orthogonal;
  each row vector of the fourth weighting matrix is orthogonal to one or more column vectors of the third weighting matrix; or
  the fourth weighting matrix is obtained by performing conjugate transposition on the third weighting matrix.

11. The antenna system according to claim 10, wherein the third multi-path digital signal comprises:
  m layers of multiple-input multiple-output (MIMO) receive signals;
  signals received by m users;
  signals received by m cells; or
  signals received in m beam directions.

12. The antenna system according to claim 7, wherein each bridge module is an intra-band combiner.

13. An access network device, wherein the access network device includes an antenna system comprising:
  a bridge network comprising n bridge modules wherein a third port of a $1^{st}$ bridge module in the n bridge modules is connected to a second port of an $n^{th}$ bridge module in the n bridge modules, a third port of an $i^{th}$ bridge module in the n bridge modules is connected to a second port of an $(i-1)^{th}$ bridge module in the n bridge modules; and an antenna module comprising n antennas, wherein fourth ports of the n bridge modules are respectively connected to the n antennas, wherein i is an integer greater than or equal to 2 and less than or equal to n, and wherein n is an integer greater than or equal to 2;

wherein the $1^{st}$ bridge module in the n bridge modules performs first weighting processing on a first analog signal input at a first port of the $1^{st}$ bridge module and a second analog signal input at a second port of the $1^{st}$ bridge module, to obtain a first component and a second component, and the $1^{st}$ bridge module outputs the first component at a fourth port of the $1^{st}$ bridge module, and inputs, at the third port of the $1^{st}$ bridge module, the second component to the second port of the $n^{th}$ bridge module in the n bridge modules, to use the second component as a second analog signal of the second port of the $n^{th}$ bridge module; and a $k^{th}$ bridge module in the n bridge modules performs first weighting processing on a first analog signal input at a first port of the $k^{th}$ bridge module and a second analog signal input at a second port of the $k^{th}$ bridge module, to obtain a first component and a second component, and the $k^{th}$ bridge module outputs the first component at a fourth port of the $k^{th}$ bridge module, and inputs, at a third port of the $k^{th}$ bridge module, the second component to a second port of a $(k-1)^{th}$ bridge module in the n bridge modules, to use the second component as a second analog signal of the second port of the $(k-1)^{th}$ bridge module, wherein k is an integer greater than 1 and less than or equal to n.

14. The access network device according to claim 13, wherein $$\begin{bmatrix} P_0 \\ P_1 \\ P_2 \\ P_3 \\ \cdots \\ \cdots \\ P_{n-1} \end{bmatrix} = Umatrix * \begin{bmatrix} p0 \\ p1 \\ p2 \\ p3 \\ \cdots \\ \cdots \\ p_{n-1} \end{bmatrix}, \begin{bmatrix} P_0 \\ P_1 \\ P_2 \\ P_3 \\ \cdots \\ \cdots \\ P_{n-1} \end{bmatrix}$$

is a matrix comprising a sum of output components of fourth ports of all of the n bridge modules, a first weighting matrix is $$Umatrix = \frac{1}{\sqrt{2}}\left(S - \frac{D*S}{(\sqrt{2}*S - D*S)}\right), S = \begin{bmatrix} 0 & 1 & 0 & \cdots \\ \cdots & 0 & \cdots & \cdots \\ 0 & \cdots & \cdots & 1 \\ 1 & 0 & 0 & 0 \end{bmatrix},$$

is an n*n matrix, $$D = \begin{bmatrix} e^{-i(2\pi\delta_0)} & 0 & \cdots & 0 \\ 0 & e^{-i(2\pi\delta_1)} & \cdots & \cdots \\ \cdots & \cdots & \cdots & 0 \\ 0 & 0 & \cdots & e^{-i(2\pi\delta_{n-1})} \end{bmatrix},$$

D is an n*n matrix, $e^{-i(x)}$ is a complex exponential function whose base is a natural number e, $\delta_0$ is a wavelength trip corresponding to a line length of a connection line between the second port of the $1^{st}$ bridge module of the bridge network and a third port of a bridge module connected to the second port of the $1^{st}$ bridge module, $\delta_1$ is a wavelength trip corresponding to a line length of a connection line between a second port of a $2^{nd}$ bridge module of the bridge network and a third port of a bridge module connected to the second port of the $2^{nd}$ bridge module, $\delta_{n-1}$ is a wavelength trip corresponding to a line length of a connection line between the second port of the $n^{th}$ bridge module of the bridge network and a third port of a bridge module connected to the second port of the $n^{th}$ bridge module, and $$\begin{bmatrix} p0 \\ p1 \\ p2 \\ p3 \\ \ldots \\ \ldots \\ p_{n-1} \end{bmatrix}$$

is a matrix comprising a first analog signal of a first port of each of the n bridge modules.

15. The access network device according to claim 13, wherein the antenna system further comprises a control module, wherein the control module is configured to set a line length of a connection line between the n bridge modules, and wherein the line length of the connection line between the n bridge modules is used to control a proportion value of output signals of first ports of the n bridge modules.

16. The access network device according to claim 14, wherein the antenna system further comprises a digital signal processing module and a digital-to-analog conversion module, the digital signal processing module is connected to a first terminal of the digital-to-analog conversion module, and a second terminal of the digital-to-analog conversion module is connected to the bridge network;
wherein the digital signal processing module is configured to perform second weighting processing on a first multi-path digital signal received by the digital signal processing module, to obtain a second multi-path digital signal, wherein the second weighting processing is implemented by using a second weighting matrix, the second weighting matrix is an n*m matrix, n is a quantity of bridge modules comprised in the antenna system, m is a quantity of signals comprised in the first multi-path digital signal, and m is an integer greater than o and less than or equal to n;
wherein the second weighting matrix meets any one of the following conditions:
column vectors of the second weighting matrix are orthogonal;
each column vector of the second weighting matrix is orthogonal to one or more row vectors of the first weighting matrix; or
the second weighting matrix is obtained by performing conjugate transposition on the first weighting matrix; and
wherein the digital-to-analog conversion module is configured to perform digital-to-analog conversion on the second multi-path digital signal, to obtain a first multi-path analog signal, wherein the first multi-path analog signal comprises a first analog signal of a first port of m of the n bridge modules.

17. The access network device according to claim 16, wherein the first multi-path digital signal comprises:
m layers of multiple-input multiple-output (MIMO) transmit signals;
signals sent by m users;
signals sent by m cells; or
signals sent in m beam directions.

18. The access network device according to claim 13, wherein each bridge module is an intra-band combiner.

* * * * *

UNITED STATES PATENT AND TRADEMARK OFFICE
CERTIFICATE OF CORRECTION

PATENT NO. : 12,255,709 B2
APPLICATION NO. : 17/896909
DATED : March 18, 2025
INVENTOR(S) : Zhang et al.

Page 1 of 1

It is certified that error appears in the above-identified patent and that said Letters Patent is hereby corrected as shown below:

In the Claims

In Column 25, in Claim 4, Line 18, delete "than o and" and insert -- than 0 and --.

In Column 26, in Claim 8, Line 34, after "Umatrix" insert -- , --.

In Column 27, in Claim 10, Line 38, after "than" delete "o" and insert -- 0 --.

In Column 28, in Claim 14, Line 53, delete "is an" and insert -- S is an --.

In Column 30, in Claim 16, Line 9, delete "than o and" and insert -- than 0 and --.

Signed and Sealed this
Twenty-ninth Day of April, 2025

Coke Morgan Stewart
*Acting Director of the United States Patent and Trademark Office*